United States Patent
Fukuda et al.

(10) Patent No.: US 10,920,881 B2
(45) Date of Patent: Feb. 16, 2021

(54) HYDRAULIC SYSTEM FOR WORKING MACHINE

(71) Applicant: KUBOTA CORPORATION, Osaka (JP)

(72) Inventors: Yuji Fukuda, Osaka (JP); Daiki Abe, Sakai (JP); Jun Tomita, Sakai (JP); Yuya Konishi, Sakai (JP); Fumitaka Fujisawa, Sakai (JP); Yudai Koga, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/449,862

(22) Filed: Jun. 24, 2019

(65) Prior Publication Data

US 2020/0002922 A1  Jan. 2, 2020

(30) Foreign Application Priority Data

Jun. 27, 2018  (JP) .................................. 2018-122393
Jun. 27, 2018  (JP) .................................. 2018-122394
Jun. 27, 2018  (JP) .................................. 2018-122395
Jun. 27, 2018  (JP) .................................. 2018-122397
Jun. 4, 2019   (JP) .................................. 2019-104519

(51) Int. Cl.
*F16H 61/4157* (2010.01)
*F16H 61/433* (2010.01)

(52) U.S. Cl.
CPC ....... *F16H 61/4157* (2013.01); *F16H 61/433* (2013.01)

(58) Field of Classification Search
CPC ... F16H 61/4157; F16H 61/433; F16H 61/423
See application file for complete search history.

(56) References Cited

U.S. PATENT DOCUMENTS 6,564,549 B2 * 5/2003 Nagura ............... F16H 61/4157
                                                         60/436

FOREIGN PATENT DOCUMENTS

JP          5809544         11/2015

* cited by examiner

*Primary Examiner* — F Daniel Lopez
(74) *Attorney, Agent, or Firm* — Greenblum & Bernstein, P.L.C.

(57) ABSTRACT

A hydraulic device includes a braking device to brake a traveling device and release braking of the traveling device, a traveling pump to drive the traveling device with pressure of operation fluid, a brake-operation valve to control operation fluid flowing to the brake device, a traveling operation valve to control operation fluid flowing to the traveling pump, a first discharge fluid tube to discharge operation fluid flowing through the brake-operation valve, the first discharge fluid tube being connected to the brake operation valve, and a second discharge fluid tube to discharge operation fluid flowing through the traveling operation valve, the second discharge fluid tube being connected to the traveling operation valve. The traveling operation valve has a set pressure that is set to be higher than a brake set pressure set by the brake operation valve.

20 Claims, 17 Drawing Sheets

HYDRAULIC SYSTEM FOR WORKING MACHINE

CROSS-REFERENCE TO RELATED APPLICATIONS

The present application claims priority under 35 U.S.C. § 119 to Japanese Patent Application No. 2018-122393, filed Jun. 27, 2018, to Japanese Patent Application No. 2018-122394, filed Jun. 27, 2018, to Japanese Patent Application No. 2018-122395, filed Jun. 27, 2018, to Japanese Patent Application No. 2018-122397, filed Jun. 27, 2018, and to Japanese Patent Application No. 2019-104519, filed Jun. 4, 2019. The contents of these applications are incorporated herein by reference in their entirety.

BACKGROUND OF THE INVENTION

Field of the Invention

The present invention relates to a hydraulic system for a working machine.

Description of Related Art

A technique for warming up a working machine is disclosed in Japanese Patent Publication No. 5,809,544.

The working machine disclosed in Japanese Patent Publication No. 5,809,544 includes a pilot pressure control valve that controls a pressure of pilot fluid outputted from a pump and supplied to a supply target, and a valve body in which the pilot pressure control valve is incorporated. In Japanese Patent Publication No. 5,809,544, the valve body is provided with a heat-up fluid tube through which the pilot fluid outputted from the pump flows. The pilot fluid flowing into the heat-up fluid tube is supplied to the operation fluid tank through the relief valve or the throttle, thereby heating up the valve body.

SUMMARY OF THE INVENTION

A hydraulic device for a working machine, includes a hydraulic pump to output operation fluid, a braking device to brake a traveling device and release braking of the traveling device with pressure of operation fluid, a traveling pump to output operation fluid to drive the traveling device with pressure of operation fluid, a brake-operation valve to control operation fluid flowing to the brake device, a traveling operation valve to control operation fluid flowing to the traveling pump, a first fluid tube connecting the brake device and the brake-operation valve, a second fluid tube connecting the traveling pump and the traveling operation valve, a third fluid tube connecting the first fluid tube and the second fluid tube, a first discharge fluid tube to discharge operation fluid flowing through the brake-operation valve, the first discharge fluid tube being connected to the brake operation valve, and a second discharge fluid tube to discharge operation fluid flowing through the traveling operation valve, the second discharge fluid tube being connected to the traveling operation valve. The traveling operation valve has a set pressure that is set to be higher than a brake set pressure set by the brake operation valve.

A hydraulic system for a working machine, includes a hydraulic pump to output operation fluid, a braking device to brake a traveling device and release braking of the traveling device with pressure of operation fluid, a speed-changing device to change speed of the traveling device with pressure of operation fluid, a brake-operation valve to control operation fluid flowing to the brake device, a speed-changing operation valve to control operation fluid flowing to the speed-changing device, a first fluid tube connecting the brake device and the brake-operation valve, a second fluid tube connecting the speed-changing device and the speed-changing operation valve, a third fluid tube connecting the first fluid tube and the second fluid tube, a first discharge fluid tube to discharge operation fluid flowing through the brake-operation valve, the first discharge fluid tube being connected to the brake operation valve, and a second discharge fluid tube to discharge operation fluid flowing through the speed-changing operation valve, the second discharge fluid tube being connected to the speed-changing operation valve. A brake set pressure of operation fluid set by the brake-operation valve is higher than a speed-changing set pressure of operation fluid set by the speed-changing operation valve.

A hydraulic system for a working machine, includes a hydraulic pump to output operation fluid, a braking device to brake a traveling device and release braking of the traveling device with pressure of operation fluid, a speed-changing device to change speed of the traveling device with pressure of operation fluid, a brake-operation valve to control operation fluid flowing to the brake device, a speed-changing operation valve to control operation fluid flowing to the speed-changing device, a first fluid tube connecting the brake device and the brake-operation valve, a second fluid tube connecting the speed-changing device and the speed-changing operation valve, a third fluid tube connecting the first fluid tube and the second fluid tube, a first discharge fluid tube to discharge operation fluid flowing through the brake-operation valve, the first discharge fluid tube being connected to the brake operation valve, and a second discharge fluid tube to discharge operation fluid flowing through the speed-changing operation valve, the second discharge fluid tube being connected to the speed-changing operation valve. A speed-changing set pressure of operation fluid set by the speed-changing operation valve is higher than a brake set pressure of operation fluid set by the brake operation valve.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
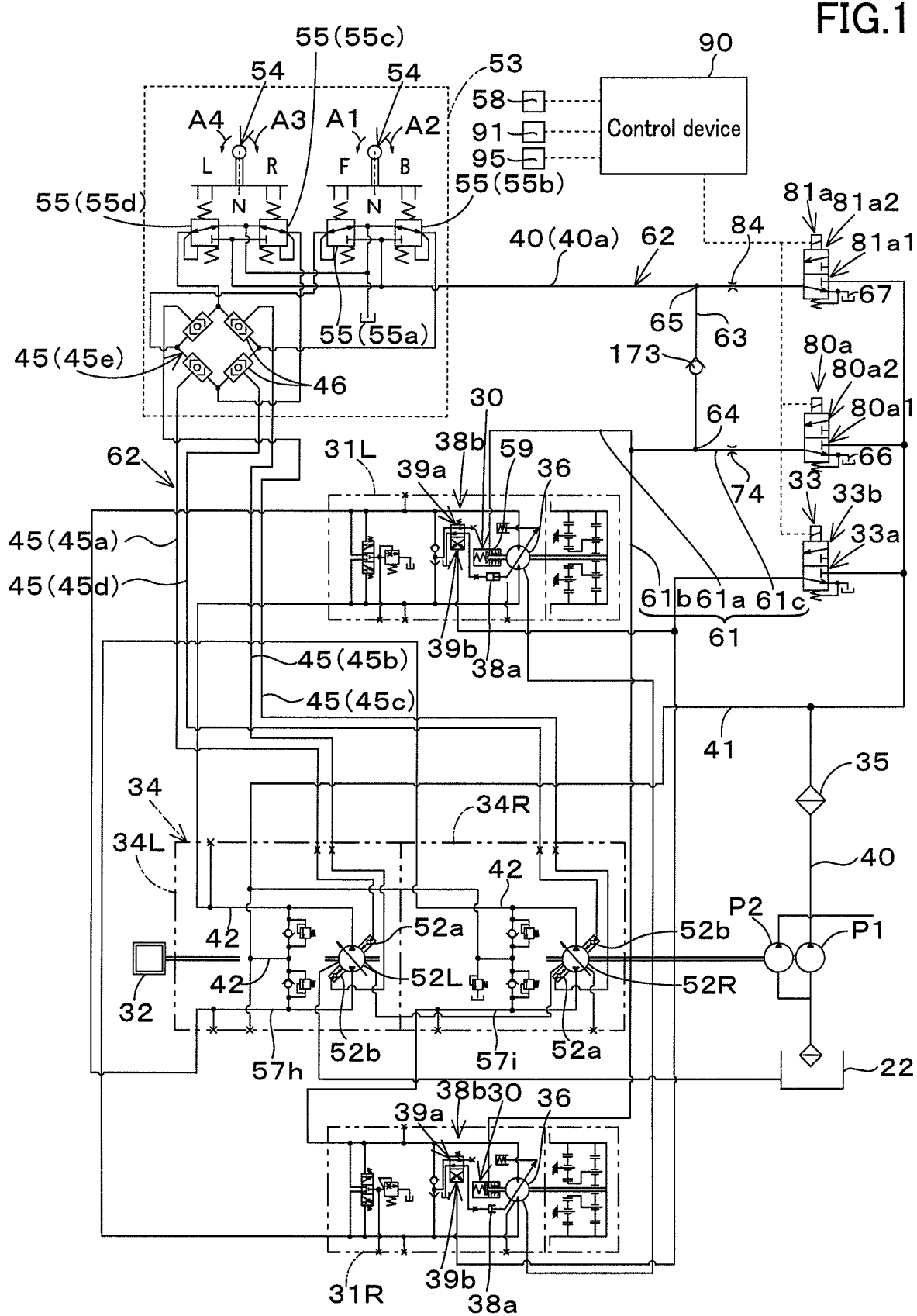
FIG. 1 is a view illustrating a hydraulic system (a hydraulic circuit) for a working machine according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with reference to the drawings.

First Embodiment

Figure 12:
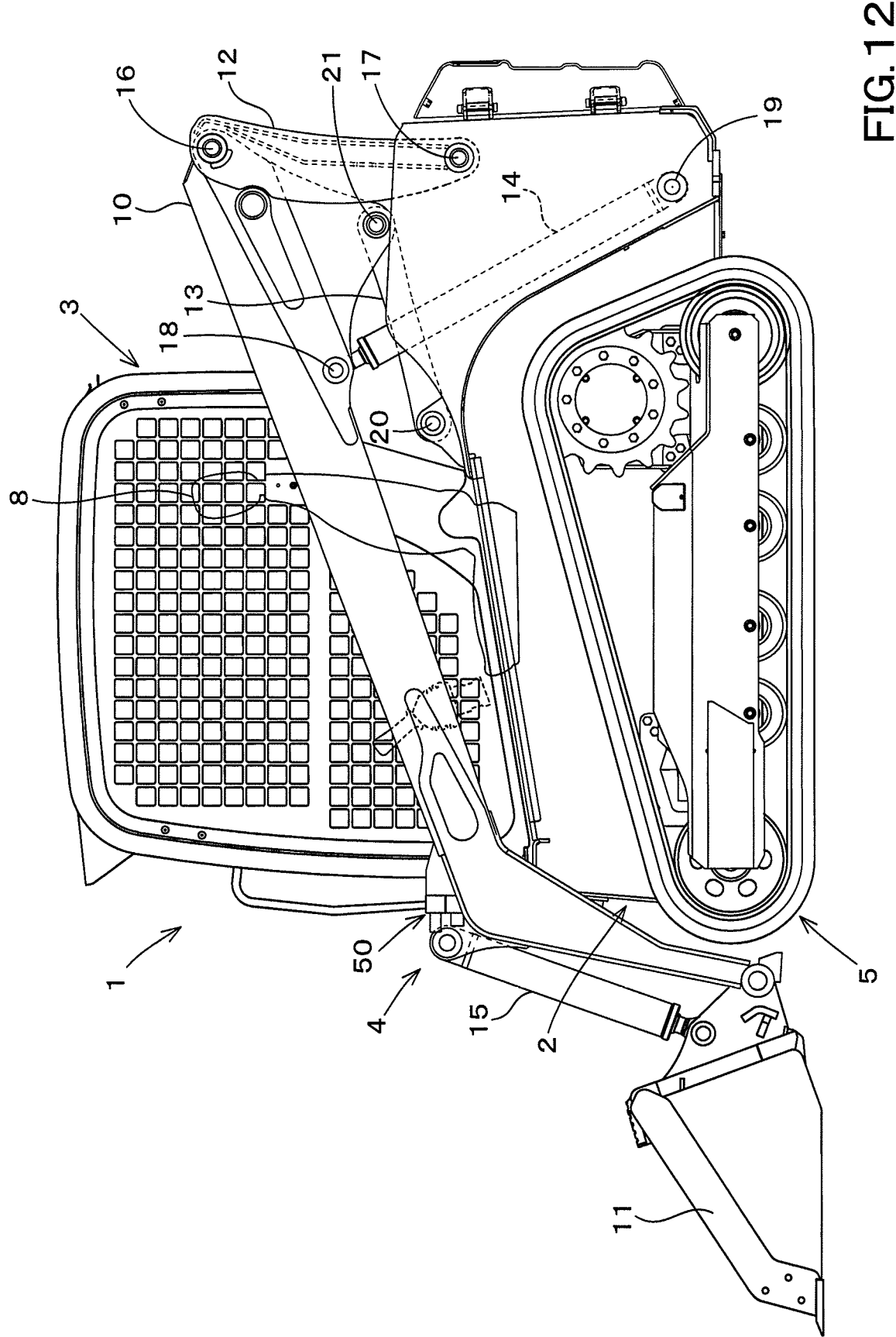
FIG. 12 is a side view illustrating a track loader that is an example of the working machine according to the embodiments.

FIG. 12 shows a side view of the working machine 1 according to the present invention. In FIG. 12, a compact track loader is shown as an example of the working machine 1. However, the working machine 1 according to the present invention is not limited to the compact track loader, and may be, for example, another type of loader working machine such as a skid steer loader. Moreover, the working machine 1 other than the loader working machine may be used.

As shown in FIG. 12, the working machine 1 includes a machine body 2, a cabin 3, a working device 4, and a traveling device 5.

In the embodiment of the present invention, the front side (the left side in FIG. 12) of the operator seated on the operator seat 8 of the working machine 1 is referred to as the front, the rear side (the right side in FIG. 12) of the operator is referred to as the rear, the left side (the front surface side of FIG. 12) of the operator is referred to as the left, and the right side (the back surface side of FIG. 12) of the operator is referred to as the right.

In addition, the horizontal direction which is a direction orthogonal to the front-back direction is referred to as a machine width direction. The direction from the center portion of the machine body 2 to the right or the left will be described as a machine outward direction. In other words, the machine outward direction corresponds to the machine width direction, and is the direction separating away from the machine body 2.

The direction opposite to the machine outward direction will be referred to as a machine inward direction. In other words, the machine inward direction corresponds to the machine width direction, and is the direction approaching the machine body 2.

The cabin 3 is mounted on the machine body 2. The cabin 3 is provided with the operator seat 8. The working device 4 is mounted on the machine body 2. The traveling device 5 is provided on the outside of the machine body 2. A prime mover 32 is mounted at the rear portion of the machine body 2.

The working device 4 includes a boom 10, a working tool 11, a lift link 12, a control link 13, a boom cylinder 14, and a bucket cylinder 15.

The boom 10 is provided on the right side of the cabin 3 and on the left side of the cabin 3, and is configured to be vertically swung. The working tool 11 is, for example, a bucket, and the bucket 11 is arranged at the tip end portion (front end portion) of the boom 10 so as to be vertically swung.

The lift link 12 and the control link 13 support the base (rear portion) of the boom 10 so that the boom 10 can swing upward and downward. The boom cylinder 14 is stretched and shortened to move the boom 10 upward and downward. The bucket cylinder 15 is stretched and shortened to swing the bucket 11.

The lift link 12, the control link 13 and the boom cylinder 14 are respectively arranged on the left side of the machine body 2 and in the right side of the machine body 2, corresponding to the booms 10 on the left side and on the right side.

The lift links 12 are provided vertically at the rear portion of the base portion of the booms 10. The upper portion (one end side) of the lift link 12 is supported rotatably about a lateral axis by a pivot shaft 16 (a first pivot shaft) near the rear portion of the base portion of each of the booms 10.

In addition, the lower portion (the other end side) of the lift link 12 is supported rotatably about the lateral axis by a pivot shaft 17 (a second pivot shaft) near the rear portion of the vehicle body 2. The second pivot shaft 17 is provided below the first pivot shaft 16.

An upper portion of the boom cylinder 14 is supported rotatably about the lateral axis by a pivot shaft 18 (a third pivot shaft). The third pivot shaft 18 is arranged at the base portion of each of the booms 10 and at the front portion of the base portion.

The lower portion of the boom cylinder 14 is supported rotatably about the lateral axis by a pivot shaft 19 (a fourth pivot shaft). The fourth pivot shaft 19 is arranged near the lower portion of the rear portion of the machine body 2 and below the third pivot shaft 18.

The control link 13 is provided in front of the lift link 12. One end of the control link 13 is supported rotatably about the lateral axis by a pivot shaft 20 (a fifth pivot shaft). The fifth pivot shaft 20 is arranged at a position corresponding to the front of the lift link 12 in the machine body 2.

The other end of the control link 13 is supported rotatably about the lateral axis by a pivot shaft 21 (a sixth pivot shaft). The sixth pivot shaft 21 is arranged in front of the second pivot shaft 17 and above the second pivot shaft 17 in the boom 10.

When the boom cylinder 14 is stretched and shortened, each of the booms 10 is swung upward and downward about the first pivot shaft 16 while the base portions of the booms 10 are supported by the lift link 12 and the control link 13, and the tip end of each boom 10 is moved upward and downward.

The control link 13 swings up and down around the fifth pivot 20 as the booms 10 move up and down. The lift link 12 swings back and forth around the second pivot shaft 17 as the control link 13 swings up and down.

Instead of the bucket 11, another working tool 11 can be attached to the front of the boom 10. Other working tools 11 are, for example, attachments (preliminary attachments) such as a hydraulic crusher, a hydraulic breaker, an angle broom, an earth auger, a pallet fork, a sweeper, a mower, a snow blower and the like.

A connecting member 50 is provided at the front of the left boom 10. The connection member 50 is a device that connects the hydraulic device equipped to the spare attachment and the first pipe member such as a pipe provided to the boom 10.

Specifically, the first pipe can be connected to one end of the connection member 50, and the second pipe connected to the hydraulic device of the backup attachment can be connected to the other end. Thus, the operation fluid flowing through the first pipe passes through the second pipe and is supplied to the hydraulic device.

The bucket cylinders 15 are respectively disposed near the front of each boom 10. By stretching and shortening the bucket cylinder 15, the bucket 11 is swung.

In the present embodiment, the traveling devices 5 of the crawler type (including the semi crawler type) are adopted as the traveling devices 5 on the left side and the right side. In addition, the travel apparatus 5 of the wheel type which has a front wheel and a rear wheel may be employed.

Next, the hydraulic system of the working machine 1 according to the present invention will be described. The hydraulic system of the working machine 1 includes a hydraulic system of a traveling system and a hydraulic system of a working system (a working hydraulic system).

As shown in FIG. 1, the hydraulic system of the traveling system is a system for driving the traveling device 5, and the hydraulic system of the traveling system is a system for driving the traveling device 5 and includes a prime mover 32, a first hydraulic pump (hydraulic pump) P1, a first traveling motor mechanism 31L, a second traveling motor mechanism 31R, and a traveling drive circuit 34.

The prime mover 32 is constituted of an electric motor, an engine and the like. In this embodiment, the prime mover 32 is an engine. The first hydraulic pump P1 is a pump driven by the power of the prime mover 32, and is constituted of a fixed displacement gear pump.

The first hydraulic pump P1 can discharge the operation fluid stored in the tank (operation fluid tank) 22. A discharging fluid tube 40 (which may be referred to as "an outputting fluid tube 40" hereinafter) for flowing the operation fluid is provided on the discharge side of the first hydraulic pump P1. A filter 35 is provided in the middle of the discharging fluid tube 40. The discharge side of the operation fluid in the discharging fluid tube 40 is branched into a plurality. A first charging fluid tube 41 is connected to the discharge side of the discharging fluid tube 40.

The first charging fluid tube 41 leads to the travel drive mechanism 34. Among the operation fluid discharged from the first hydraulic pump P1, the operation fluid used for control may be called pilot fluid, and the pressure of the pilot fluid may be called pilot pressure.

The travel drive mechanism 34 is a mechanism for driving the first traveling motor mechanism 31L and the second traveling motor mechanism 31R, and includes a drive circuit (drive circuit for left) 34L for driving the first traveling motor mechanism 31L and a drive circuit (drive circuit for right) 34R for driving the second traveling motor mechanism 31R.

The drive circuits 34L and 34R respectively include HST pumps (traveling pumps) 52L and 52R, speed-changing fluid tubes (shifting fluid tubes) 57h and 57i, and a second charging fluid tube 42. The shifting fluid tubes 57h and 57i are fluid tubes connecting the HST pumps 52L and 52R and the HST motor 36.

The second charging fluid tube 42 is connected to the shifting fluid tubes 57h and 57i, and is a fluid tube for replenishing the operation fluid from the first hydraulic pump P1 to the shifting fluid tubes 57h and 57i. The HST pumps 52L and 52R are swash plate type variable displacement axial pumps to be driven by the power of the prime mover 32.

The HST pumps 52L and 52R have a forward pressure receiving portion 52a on which a pilot pressure acts and a reverse pressure receiving portion 52b, and the angle of the swash plate is changed by the pilot pressure acting on the pressure portions 52a and 52b. By changing the angle of the swash plate, it is possible to change the output of the HST pumps 52L and 52R (the amount of discharge of the operation fluid) and the discharge direction of the operation fluid.

In other words, the HST pumps 52L and 52R change the driving force output to the traveling device 5 by changing the angle of the swash plate.

The first traveling motor mechanism 31L is a mechanism for transmitting power to the drive shaft of the traveling device 5 provided on the left side of the vehicle body 2. The second traveling motor mechanism 31R is a mechanism for transmitting power to the drive shaft of the traveling device 5 provided on the right side of the vehicle body 2. The first traveling motor mechanism 31L includes an HST motor (traveling motor) 36 and a transmission mechanism.

The HST motor 36 is a swash plate type variable displacement axial motor and can change the vehicle speed (rotation) to the first speed or the second speed. In other words, the HST motor 36 is a motor that can change the propulsive force of the working machine 1.

The transmission mechanism includes a swash plate switching cylinder 38a and a switching valve 38b. The swash plate switching cylinder 38a is a cylinder that changes the angle of the swash plate of the HST motor 36 by expansion and contraction. The switching valve 38b is a valve for stretching and shortening the swash plate switching cylinder 38a to one side or the other side, and is a two-position switching valve that switches between the first position 39a and the second position 39b.

Switching of the switching valve 38b is performed by the shift switching valve (speed-changing switching valve) 33. The shift switching valve 33 is connected to the discharging fluid tube 40 and is connected to the switching valve 38b of the first traveling motor mechanism 31L and the switching valve 38b of the second traveling motor mechanism 31R.

The shift switching valve 33 is a two-position switching valve that can switch between the first position 33a and the second position 33b. When the speed change switch valve 33 is set to the first position 33a, the pressure of the operation fluid applied to the switch valve 38b is set to a pressure (deceleration pressure) corresponding to a predetermined speed (for example, first speed).

In addition, when the shift switching valve 33 is set to the second position 33b, the pressure of the operation fluid applied to the switching valve 38b is set to a pressure (accelerating pressure) corresponding to the speed (second speed) faster than the predetermined speed (first speed). In this manner, when the shift switching valve 33 is at the first position 33a, the switching valve 38b is at the first position 39a, and the swash plate switching cylinder 38a is shortened accordingly, and the HST motor 36 can be set to the first speed.

Further, when the shift switching valve 33 is at the second position 33b, the selector valve 38b is at the second position 39b, and the swash plate switching cylinder 38a is extended accordingly, and the HST motor 36 can be set to the second speed. The HST motor 36 is shifted at the first or second speed under the control of the control device 90. For example, the control device 90 is provided with an operation member 58 such as a switch (shift switch).

When the operating member 58 is switched to the first speed, the control device 90 outputs a control signal for demagnetizing the solenoid of the shift switching valve 33 to set the shift switching valve 33 to the first position 33a. In addition, when the operating member 58 is switched to the second speed, the control device 90 outputs a control signal for exciting the solenoid of the shift switching valve 33 to set the shift switching valve 33 to the second position 33b.

Further, the first traveling motor mechanism 31L has a brake mechanism 30. The brake mechanism 30 can stop the rotation of the output shaft, which rotates with the braking of the right-side traveling device 5, that is, the rotation of the HST motor 36 or the rotation of the HST motor 36.

The brake mechanism 30 changes to an operating state for braking the traveling motor mechanism 31 or an operating state for releasing the braking by the pilot fluid (operation fluid) discharged from the first hydraulic pump P1.

For example, the brake mechanism 30 includes a first disc provided on the output shaft of the traveling motor mechanism 31, a movable second disc, and a spring urging the second disc into contact with the first disc.

In addition, the brake mechanism 30 includes a housing portion (storage case) 59 for housing the first disk, the second disk, and the spring. In the housing portion 59, a portion in which the second disk is housed and the brake switching valve 80a are connected via a fluid tube as described later. The brake switching valve 80a is an electromagnetic valve for performing braking and releasing the braking (braking release) in the brake mechanism 30, and is a two-position switching valve capable of switching between the first position 80a1 and the second position 80a2.

When the brake switching valve 80a is at the first position 80a1, the pressure (pressure acting on the housing portion 59) of the operation fluid acting on the brake mechanism 30 is set to the pressure (braking pressure) on which the brake mechanism 30 brakes. In addition, when the brake switching valve 80a is at the second position 80a2, the pressure of the operation fluid is set to a pressure (release pressure) or more for braking release.

The switching of the brake switching valve 80a is performed by the control of the control device 90. For example, a control signal for demagnetizing the solenoid of the brake switching valve 80a is output to the control device 90 to set the brake switching valve 80a to the first position 80a1.

Further, the control device 90 outputs a control signal for exciting the solenoid of the brake switching valve 80a to set the brake switching valve 80a to the second position 80a2. Further, the control signal may be output from the control device 90 to the brake switching valve 80a by, for example, providing a switch and manually operating the switch, the control device 90 may control the operating condition of the working machine, or may automatically control it based on the determination of the working machine.

Thus, when the brake switching valve 80a is at the first position 80a1, the pilot fluid in the storage portion of the storage portion 59 is discharged, and the second disk moves in the braking direction, so that the braking mechanism 30 can perform the braking. Also, when the brake switching valve 80a is at the second position 80a2, the pilot fluid is supplied to the storage portion of the storage portion 59, and the second disc moves to the opposite side to the braking (opposite to the biasing direction of the spring), then the braking mechanism 30 can release the braking.

The second traveling motor mechanism 31R has the same configuration as the first traveling motor mechanism 31L, and the configuration shown in the first traveling motor mechanism 31L may be replaced with the second traveling motor mechanism 31R. Thus, the explanation thereof is omitted.

As shown in FIG. 1, the working machine 1 includes an operating device 53. The operating device 53 is a device that operates the traveling device 5, that is, the first traveling motor mechanism 31L, the second traveling motor mechanism 31R, and the traveling drive mechanism 34. The operating device 53 has a first operating member 54 and a plurality of operation valves 55 (55a, 55b, 55c, and 55d).

The first operation member 54 is an operation member supported by the operation valve 55 and pivoted in the left-right direction (machine width direction) or in the front-rear direction. Further, the plurality of operation valves 55 are operated by the common, that is, one first operating member 54. The plurality of operation valves 55 operate based on the swing of the first operation member 54.

The operation fluid (pilot fluid) from the first hydraulic pump P1 can be supplied to the plurality of operation valves 55 through the discharging fluid tube 40. The plurality of control valves 55 includes the control valve 55a, the control valve 55b, the control valve 55c, and the control valve 55d.

The plurality of operation valves 55 and the travel drive mechanism 34 (travel pumps 52L and 52R) of the travel system are connected by a travel fluid tube 45. The traveling fluid tube 45 includes a first traveling fluid tube 45a, a second traveling fluid tube 45b, a third traveling fluid tube 45c, a fourth traveling fluid tube 45d, and a fifth traveling fluid tube 45e. The first traveling fluid tube 45a is a fluid tube connected to the forward pressure receiving portion 52a of the traveling pump 52L.

The second traveling fluid tube 45b is a fluid tube connected to the reverse pressure receiving portion 52b of the traveling pump 52L. The third traveling fluid tube 45c is a fluid tube connected to the forward pressure receiving portion 52a of the traveling pump 52R. The fourth traveling fluid tube 45d is a fluid tube connected to the backward pressure receiving portion 52b of the traveling pump 52R.

The fifth traveling fluid tube 45e is a fluid tube connecting the operation valve 55, the first traveling fluid tube 45a, the second traveling fluid tube 45b, the third traveling fluid tube 45c, and the fourth traveling fluid tube 45d. The fifth travel fluid tube 45e connects the plurality of shuttle valves 46 and the plurality of operation valves 55 (55a, 55b, 55c, and 55d).

When the first operation member 54 is swung forward (in the direction of arrow A1 in FIG. 1), the operation valve 55a is operated to output a pilot pressure from the operation valve 55a, and the output shaft of the traveling motor 36 performs the first operation. At a speed proportional to the amount of swinging of the member 54, the working machine 1 advances straight forward (forward rotation) at normal speed.

When the first operation member 54 is swung backward (in the direction of arrow A2 in FIG. 1), the operation valve 55b is operated to output a pilot pressure from the operation valve 55b, and the output shaft of the traveling motor 36 rotates in a reverse direction at a speed proportional to the amount of rocking of the operation member 54 (reverse rotation), and the working machine 1 travels straight and backward.

When the first operation member 54 is swung to the right (in the direction of arrow A3 in FIG. 1), the operation valve 55c is operated to output a pilot pressure from the operation valve 55c, and the output of the left traveling motor 36 rotates in a normal direction and the output of the right traveling motor 36 rotates in a reverse direction, and the working machine 1 turns right.

When the first operation member 54 is swung leftward (in the direction of arrow A4 in FIG. 1), the operation valve 55d is operated to output a pilot pressure from the operation valve 55d, and the output of the left traveling motor 36 rotates in a reverse direction and the output of the right traveling motor 36 rotates in a normal direction, and the working machine 1 turns left.

In addition, when the first operation member 54 is swung in an oblique direction, the pressure difference between pilot pressure acting on the pressure receiving portion 52a and the pressure receiving portion 52b causes the output shafts of the left traveling motor 36 and the right traveling motor 36 to move. The rotational direction and rotational speed are determined, and the working machine 1 turns right or left while advancing or reversing.

As shown in FIG. 1, the discharging fluid tube 40 is connected to a hydraulic lock switching valve 81a that can stop the operation fluid supplied to the operation device 53 (the operation valves 55a, 55b, 55c, and 55d). The hydraulic lock switching valve 81a is a two-position switching valve that can be switched between the first position 81a1 and the second position 81a2.

When the hydraulic lock switching valve 81a is set to the first position 81a1, the pilot fluid from the first hydraulic pump P1 is not supplied to the operation valves 55a, 55b, 55c, and 55d, and the operation is performed even if the first operation member 54 is operated. The pressure of the operation fluid by the valves 55a, 55b, 55c, and 55d does not act on the HST pumps (traveling pumps) 52L and 52R.

When the hydraulic lock switching valve 81a is set to the second position 81a2, the pilot fluid from the first hydraulic pump P1 is supplied to the operation valves 55a, 55b, 55c, and 55d, and the operation is performed according to the operation of the first operation member 54. The pressure of the operation fluid by the valves 55a, 55b, 55c, and 55d acts on the HST pumps (traveling pumps) 52L and 52R in the unlocked state.

The hydraulic system of the working machine 1 connects the first fluid tube connected to the first hydraulic device and the second fluid tube connected to the second hydraulic device via the third fluid tube, and supplies the first hydraulic device to the first hydraulic device. By connecting the first discharging fluid tube to the first operation valve that controls the operation fluid and connecting the second discharging fluid tube to the second operation valve that controls the operation fluid supplied to the second hydraulic device, the warm-up can be easily facilitated.

In this embodiment, the first hydraulic device is the brake mechanism 30, and the second hydraulic device is the travel drive mechanism 34. In addition, the first operation valve the braking switching valve 80a that is one of the braking operation valves for controlling the operation fluid supplied to the brake mechanism 30, and the second operation valve is the hydraulic lock switching valve 81a that is one of the traveling operation valves for controlling the operation fluid supplied to the travel driving mechanism 34.

Hereinafter, the first fluid tube, the second fluid tube, and the third fluid tube will be described.

Figure 2A:
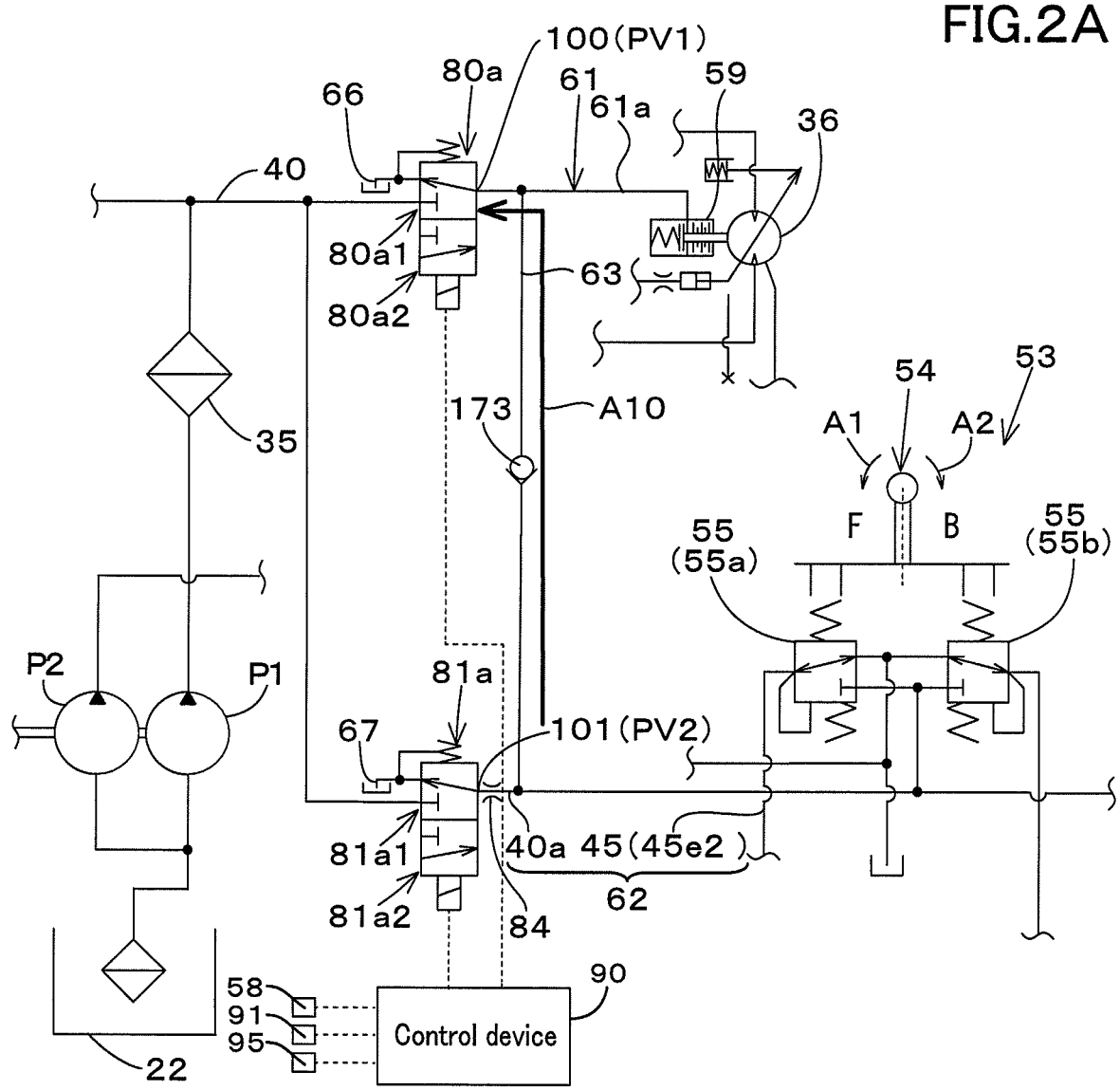
FIG. 2A is a partially-enlarged view illustrating a traveling hydraulic system for the working machine according to the first embodiment.

As shown in FIG. 1 and FIG. 2A, the first fluid tube 61 is a first hydraulic device (the brake mechanism 30) and a first operation valve (brake switching valve) 80a for controlling the operation fluid supplied to the first hydraulic device (the brake mechanism 30). In this embodiment, the first fluid tube 61 includes a first brake fluid tube 61a and a second brake fluid tube 61b.

The first brake fluid tube 61a is a fluid tube connecting the brake mechanism 30 of the first traveling motor mechanism 31L and the brake switching valve (first operation valve) 80a. The second brake fluid tube 61b is a fluid tube connecting the brake mechanism 30 of the second traveling motor mechanism 31R and the brake switching valve (first operation valve) 80a. The first brake fluid tube 61a and the second brake fluid tube 61b are connected each other in middle portions, and the combined fluid tube (a combined fluid tube of the first brake fluid tube 61a and the second brake fluid tube 61b) 61c is connected to the switching valve 80a.

The combined fluid tube 61c is provided with a throttle portion 74 for reducing the flow rate of the operation fluid. In other words, in the first fluid tube 61, the throttling portion 74 is arranged in the section between a connection portion (a confluent portion 64 described later) where the third fluid tube 63 is connected to the first fluid tube 61 and a connection portion connected to the brake switching valve 80a.

A first discharging fluid tube 66 is connected to the discharge port of the brake switching valve 80a. The first discharging fluid tube 66 can discharge the operation fluid that has passed through the brake switching valve 80a, that is, the operation fluid of the first fluid tube 61 (the first brake fluid tube 61a and the second brake fluid tube 61b). The first discharging fluid tube 66 is connected to the suction portion of the hydraulic pump, the operation fluid tank 22 and the like.

The second fluid tube 62 controls the operation fluid supplied to the second hydraulic device (the traveling pumps 52L and 52R of the traveling drive mechanism 34) and the second hydraulic device (the traveling pumps 52L and 52R of the traveling drive mechanism 34). This is a fluid tube connecting the two operation valves (hydraulic lock switching valve) 81a.

In this embodiment, the second fluid tube 62 includes a section (a fluid tube) 40a connecting the hydraulic lock switching valve 81a and the operation valves 55a, 55b, 55c, and 55d in the discharging fluid tube 40 and the traveling fluid tube 45 connecting the operation valves 55a, 55b, 55c, and 55d and the traveling pumps 52L and 52R.

A second discharging fluid tube 67 is connected to the discharge port of the hydraulic lock switching valve 81a. The second discharging fluid tube 67 can discharge the operation fluid that has passed through the hydraulic lock switching valve 81a, that is, the operation fluid of the second fluid tube 62. The second discharging fluid tube 67 is connected to the suction portion of the hydraulic pump, to the operation fluid tank 22 and the like.

The third fluid tube 63 is a fluid tube connecting the first fluid tube 61 and the second fluid tube 62. The third fluid tube 63 connects a confluent portion 64 where the first brake fluid tube 61a and the second brake fluid tube 61b join and a joining portion 65 where the fluid tube 40a joins. The third fluid tube 63 is connected to the upstream side of the operation valves 55a, 55b, 55c, and 55d in the discharging fluid tube 40.

That is, the third fluid tube 63 is connected to the primary side of the operation valves 55a, 55b, 55c, and 55d. Further, a check valve 173 is connected to the third fluid tube 63. The check valve 173 allows operation fluid from the second fluid tube 62 to the first fluid tube 61 and blocks operation fluid from the first fluid tube 61 to the second fluid tube 62.

As shown in FIG. 1 and FIG. 2A, in the fluid tube 40a, a throttling portion 84 is provided between the merging portion 65 and the second operation valve (hydraulic lock switching valve) 81a. The throttling portion 84 may be provided on the discharging fluid tube 40 on the upstream side of the second operation valve (hydraulic lock switching valve) 81a.

The control device 90 sets a differential pressure between the brake setting pressure (first setting pressure) PV1 set by the brake switching valve (first operation valve) 80a and the setting pressure (second setting pressure) PV2 set by set by the second operation valve (hydraulic lock switching valve) 81a.

The brake setting pressure PV1 is, for example, the pressure of the output port 100 of the brake switching valve 80a. In other words, the first set pressure PV1 is a pressure that acts on the first fluid tube 61 (the first brake fluid tube 61a and the second brake fluid tube 61b).

The second set pressure (set pressure) PV2 is, for example, the pressure of the output port 101 of the hydraulic lock switching valve 81a. In other words, the second set pressure PV2 is a pressure acting on the second fluid tube 62.

The control device 90 controls the brake switching valve 80a and the hydraulic lock switching valve 81a so that a differential pressure between the first set pressure PV1 and the second set pressure PV2 is generated. For example, in the warm-up mode for warming up, the controller 90 lowers the brake setting pressure PV1 of the brake switching valve 80a to be lower than the setting pressure PV2 of the hydraulic lock switching valve 81a.

In other words, when in the warm-up mode, the control device 90 sets the set pressure PV2 of the hydraulic lock switching valve 81a higher than the brake setting pressure PV1 of the brake switching valve 80a.

Specifically, when the warm-up mode is set, the control device 90 sets the brake setting pressure PV1 to the braking pressure at which the brake mechanism 30 brakes by setting the brake switching valve 80a to the first position 80a1. Further, when the warm-up mode is set, the control device 90 causes the hydraulic pressure lock switching valve 81a to be at the second position 81a2 and thereby to make the set pressure PV2 higher than the brake setting pressure PV1.

That is, when the brake switching valve 80a is in the braking state and the hydraulic lock switching valve 81a is in the unlocked state, the brake setting pressure PV1 is lower than the setting pressure PV2, and the setting pressure PV2 set by the hydraulic lock switching valve 81a is higher than the brake setting pressure PV1 of the operation fluid set by the brake switching valve 80a.

As indicated by arrow A10 in FIG. 2A, when the brake setting pressure PV1 is lower than the set pressure PV2, the operation fluid that has passed through the hydraulic lock switching valve 81a flows to the fluid tube 61 through the second fluid tube 62 and the third fluid tube 63, and is discharged to the first discharging fluid tube 66 from the discharge port of the brake switching valve 80a. Thereby, the first fluid tube (brake fluid tube) and the second fluid tube (traveling fluid tube) can be warmed up.

In the warm-up mode, for example, the mode switch 95 which can be switched ON/OFF is connected to the control device 90, and the warm-up mode is set when the mode switch 95 is ON, and the warm-up mode is released when the mode switch 95 is turned off.

Figure 2B:
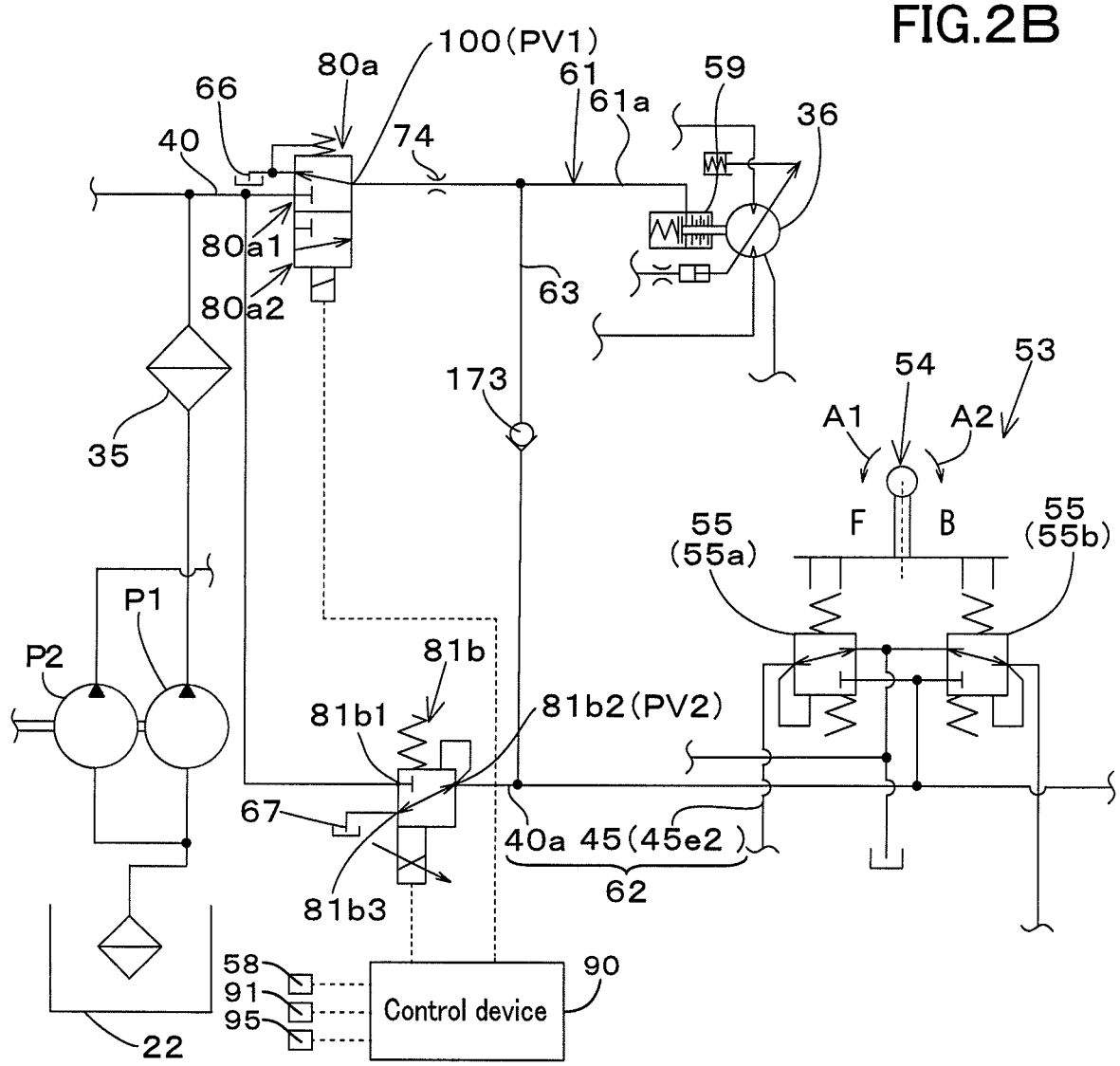
FIG. 2B is a view illustrating a first modified example of FIG. 2A.

FIG. 2B is a diagram showing a first modification of FIG. 2A. For convenience of explanation, FIG. 2B shows a fluid tube on the first traveling motor mechanism 31L side; however, a fluid tube on the second traveling motor mechanism 31R side is omitted, and the configuration of FIG. 2 may be applied to the fluid tube on the second traveling motor mechanism 31R side.

As shown in FIG. 2B, the first modified example is an example in which the second actuation valve is changed to an anti-stall proportional valve 81b configured by a solenoid proportional valve.

Figure 4:
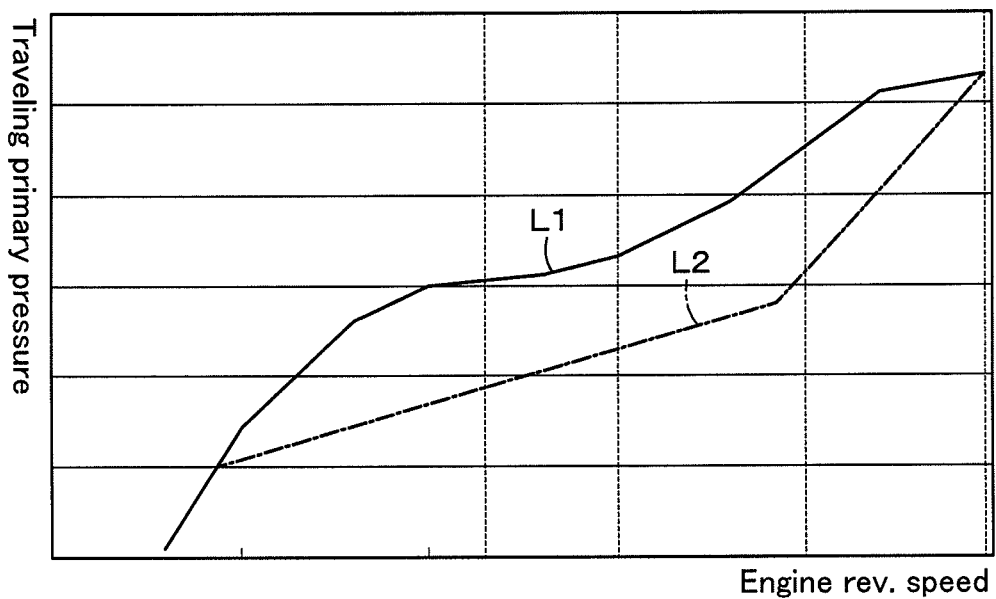
FIG. 4 is a view illustrating a relation between an engine revolving speed and a traveling primary pressure according to the first embodiment.

The anti-stall proportional valve 81 b performs control (anti-stall control) for preventing engine stall. FIG. 4 shows the relationship between the engine speed, the traveling primary pressure, and the control lines L1 and L2. The traveling primary pressure is the pressure (pilot pressure) of the operation fluid in the section from the anti-stall proportional valve 81b to the operation valve 55 (the operation valve 55a, the operation valve 55b, the operation valve 55c, the operation valve 55d) in the discharging fluid tube 40.

That is, it is the primary pressure of the operation fluid which enters the operation valve 55 provided on the operation member 54. The control line L1 shows the relationship between the engine rotational speed and the traveling primary pressure when the drop amount is less than a predetermined amount. The control line L2 indicates the relationship between the engine rotational speed and the traveling primary pressure when the drop amount is equal to or greater than a predetermined amount.

When the drop amount is less than a predetermined amount, the controller 90 adjusts the opening aperture of the anti-stall proportional valve 81b such that the relationship between the actual engine speed and the traveling primary pressure matches the control line L1. Further, when the drop amount is a predetermined amount or more, the control device 90 adjusts the opening aperture of the anti-stall proportional valve 81b so that the relationship between the actual engine speed and the traveling primary pressure matches the control line L2.

In control line L2, the traveling primary pressure for a predetermined engine speed is lower than the traveling primary pressure in control line L1. That is, when focusing on the same engine rotational speed, the traveling primary pressure of the control line L2 is lower than the traveling primary pressure of the control line L1. Thus, the pressure (pilot pressure) of the operation fluid entering the control valve 55 is suppressed low by the control based on the control line L2.

As a result, the swash plate angle of the HST pump (traveling pump) 52 is adjusted, the load acting on the engine is reduced, and thus the engine stall can be prevented. Although one control line L2 is shown in FIG. 4, a plurality of control lines L2 may be provided.

For example, the control line L2 may be set for each engine speed. Further, it is preferable that the control device 90 has data indicating the control line L1 and the control line L2, or control parameters such as a function.

The anti-stall proportional valve 81*b* has a primary port (pump port) 81*b*1 and a secondary port 81*b*2. The primary port 81*b*1 of the anti-stall proportional valve 81*b* is connected to the discharging fluid tube 40. The secondary port 81*b*2 of the anti-stall proportional valve 81*b* is connected to the second fluid tube 62 (fluid tube 40*a*).

The discharge port 81*b*3 of the anti-stall proportional valve 81*b* is connected to the operation fluid tank 22 via a second discharging fluid tube 67. In the anti-stall proportional valve 81*b*, the second set pressure (set pressure) PV2 is the pressure of the secondary port 81*b*2.

In the first modification, when the warm-up mode is set, the control device 90 sets the brake switching valve 80*a* to the first position 80*a*1 and sets the opening aperture of the anti-stall proportional valve 81*b* to the maximum. That is, in the warm-up mode, the control device 90 sets the brake setting pressure PV1 of the brake switching valve 80*a* to the braking pressure and the setting pressure PV2 of the anti-stall proportional valve 81*b* to the braking pressure or more.

Thus, even when the hydraulic lock switching valve 81*a* is changed to the anti-stall proportional valve 81*b*, it is possible to set the brake setting pressure PV1 to be slammer then the set pressure PV2 by setting the opening aperture of the anti-stall proportional valve 81*b*.

Also in this case, the operation fluid that has passed through the anti-stall proportional valve 81*b* flows through the second fluid tube 62 and the third fluid tube 63 to the first fluid tube 61, and can be discharged from the first discharge fluid tube 66 from the discharge port of the brake switching valve 80*a*.

When the warm-up mode is not set, the control device 90 performs anti-stall control based on the number of revolutions of the engine as described above. In the embodiment described above, the opening aperture of the anti-stall proportional valve 81*b* is maximized, but the opening aperture may be set so that the second set pressure (set pressure) PV2 is higher than the brake setting pressure PV1.

Figure 2C:
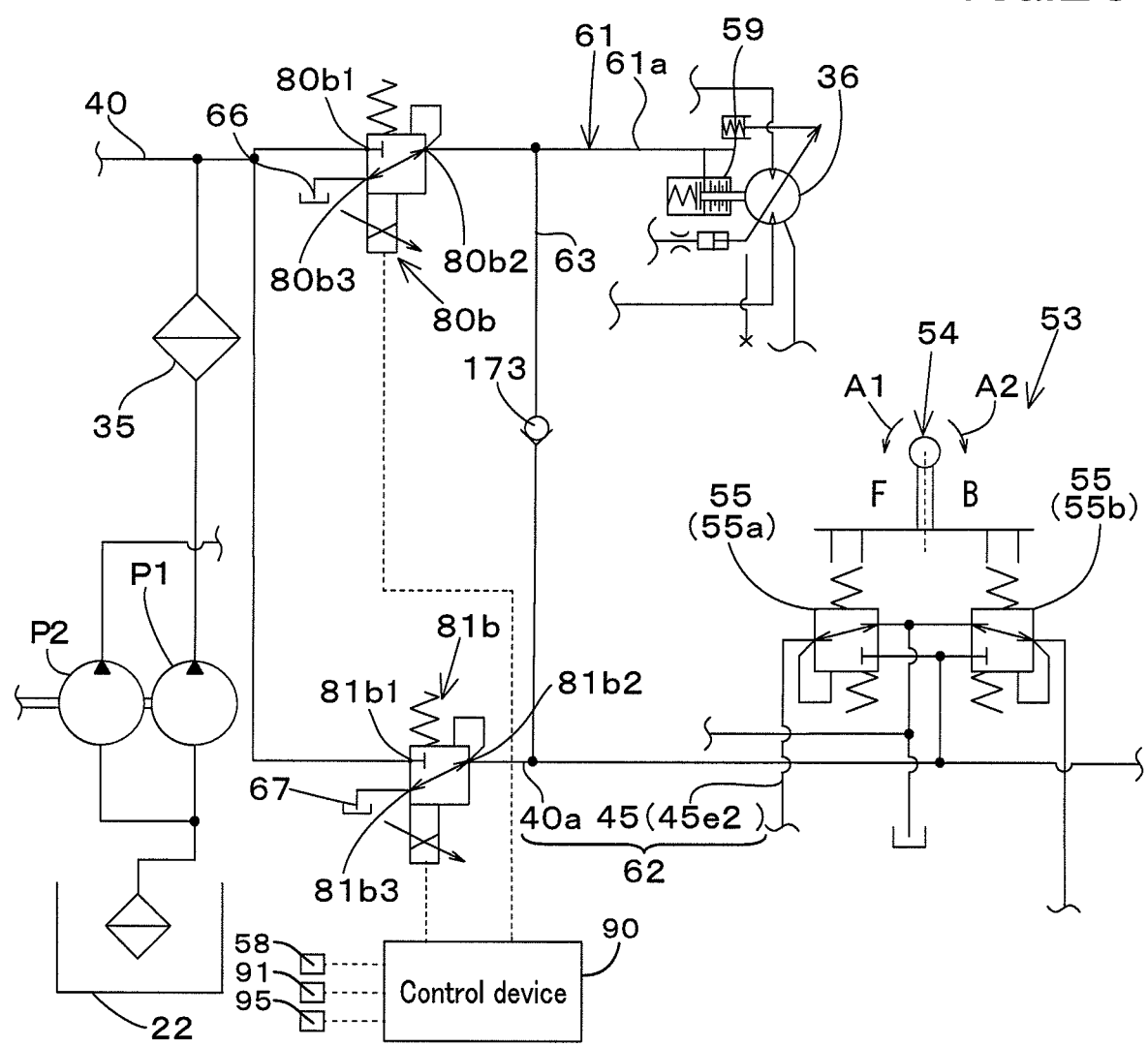
FIG. 2C is a view illustrating a second modified example of FIG. 2B.

FIG. 2C shows a second modification of FIG. 2B. In the second modified example, as shown in FIG. 2C, the brake actuating valve is changed to an electromagnetic proportional valve (brake proportional valve) 80*b*. The brake proportional valve 80*b* has a primary port (pump port) 80*b*1 and a secondary port 80*b*2.

The primary port 80*b*1 of the brake proportional valve 80*b* is connected to the discharging fluid tube 40. The secondary port 80*b*2 of the brake proportional valve 80*b* is connected to the first fluid tube 61.

The discharge port 80*b*3 of the brake proportional valve 80*b* is connected to the operation fluid tank 22 via the first discharging fluid tube 66. In the brake proportional valve 80*b*, the first set pressure PV1 is the pressure of the secondary port 80*b*2.

In the second modification, when the warm-up mode is set, the control device 90 sets the opening aperture of brake proportional valve 80*b* to the minimum so as to obtain the braking pressure at which the brake mechanism 30 performs the braking, while the opening aperture of the anti-stall proportional valve 81*b* is set to the maximum. That is, in the warm-up mode, the control device 90 sets the brake setting pressure PV1 of the brake proportional valve 80*b* to the braking pressure and the setting pressure PV2 of the anti-stall proportional valve 81*b* to the braking pressure or more.

Thus, even when the brake switching valve 80*a* is changed to the brake proportional valve 80*b*, the brake setting pressure PV1 can be set to be smaller than the set pressure PV2 by setting the opening apertures of the brake proportional valve 80*b* and the anti-stall proportional valve 81*b*.

Also in this case, the operation fluid having passed through the anti-stall proportional valve 81*b* flows through the second fluid tube 62 and the third fluid tube 63 to the first fluid tube 61, and the operation fluid can be discharged from the discharge port 80*b*3 of the brake proportional valve 80*b* to the fluid tube 66.

Figure 3:
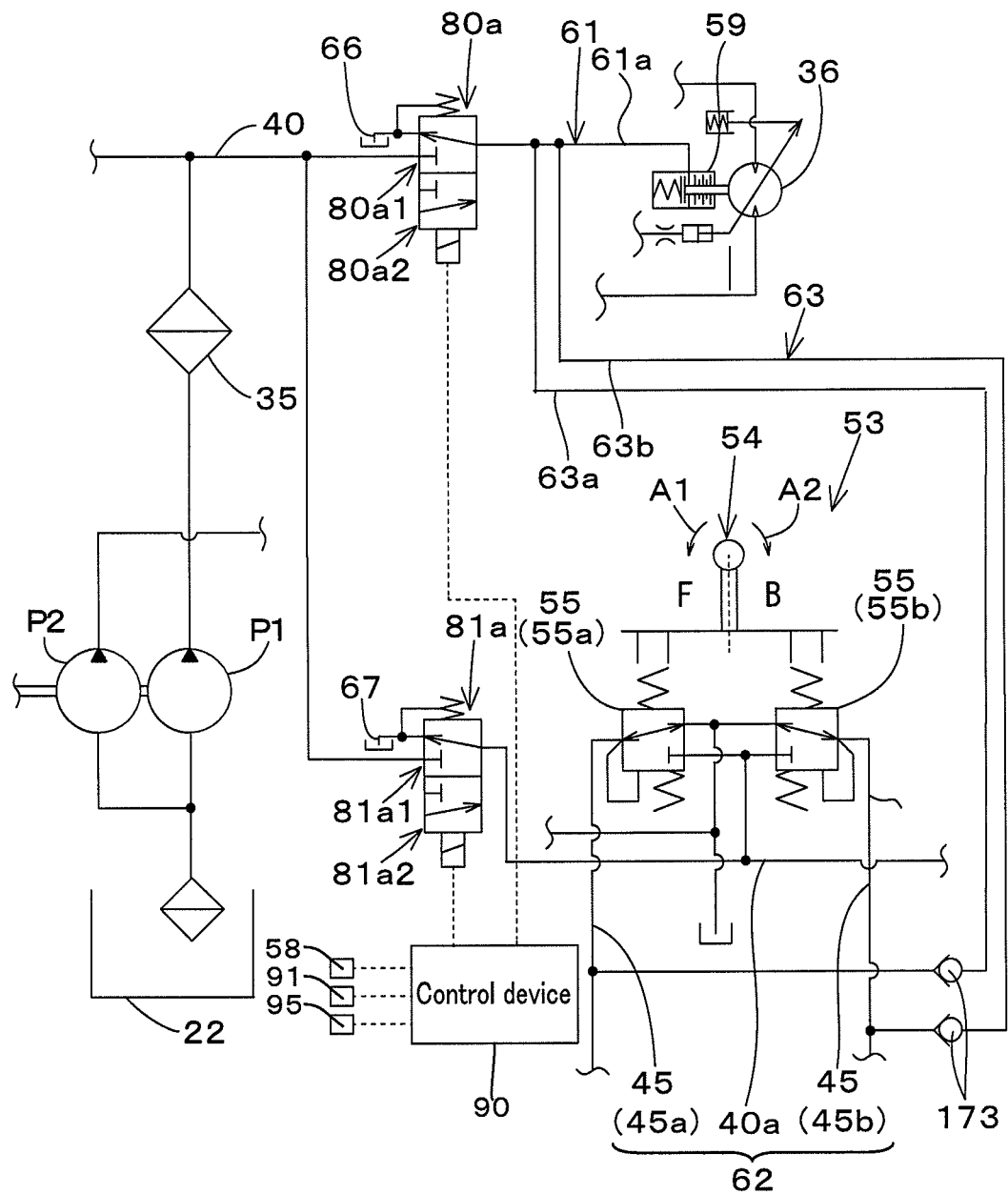
FIG. 3 is a view illustrating a third modified example in which a connection target of a third fluid tube is changed according to the first embodiment.

FIG. 3 shows a third modification of the third fluid tube 63. In the embodiment described above, the third fluid tube 63 is connected to the upstream side (primary side) of the operation valves 55*a*, 55*b*, 55*c*, and 55*d*, but in the third modification, the third fluid tube 63 is connected to the downstream (secondary side) of the operation valves 55*a*, 55*b*, 55*c*, and 55*d*.

For convenience of explanation, although FIG. 3 shows the operation valves 55*a* and 55*b* among the plurality of operation valves 55*a*, 55*b*, 55*c* and 55*d*, other operation valves 55*c* and 55*d* and the traveling fluid tubes 45*c* and 45*d* connected to the operation valves 55*c* and 55*d* are also applicable.

The third fluid tube 63 includes a first warm-up fluid tube 63*a* and a second warm-up fluid tube 63*b*. The first warm-up fluid tube 63*a* is connected to a first traveling fluid tube 45*a* that constitutes the second fluid tube 62. The second warm-up fluid tube 63*b* is connected to a second traveling fluid tube 45*b* that constitutes the second fluid tube 62. A check valve 173 is connected to the first traveling fluid tube 45*a* and the second traveling fluid tube 45*b*.

Also in the third modification, when the warm-up mode is set, the controller 90 sets the hydraulic lock switching valve 81*a* to the unlocking state (locking release pressure), and sets the brake setting pressure PV1 to be smaller the set pressure PV2 by setting the brake switching valve 80*a* to the braking state (braking pressure).

Then, the operation fluid of the first traveling fluid tube 45*a* and the second traveling fluid tube 45*b*, which are the second fluid tube 62, pass through the first warm-up fluid tube 63*a* and the second warm-up fluid tube 63*b*, and the operation fluid can be discharged from the discharge port of the brake switching valve 80*a*.

Although FIG. 3 shows the brake switching valve 80*a* and the hydraulic lock switching valve 81*a*, the brake proportional valve 80*b* and the anti-stall proportional valve 81*b* may be used as described above.

In the embodiment described above, a first measurement device capable of measuring the first set pressure (brake setting pressure) PV1 set by the first operation valve, that is, the brake operation valve (the brake switching valve 80*a*, the brake proportional valve 80*b*) may be connected to a second measurement device capable of measuring the second set pressure PV2 set by the second operation valve, that is, the traveling operation valve (the hydraulic lock switching valve 81*a*, the anti-stall proportional valve 81*b*), and the controller 90 may control the first operation valve and the second operation valve in the warm-up mode such that the brake setting pressure PV1 can be smaller than the set pressure PV2.

The control device 90 may estimate the first set pressure (brake setting pressure) PV1 and the second set pressure (set pressure) PV2 from the driving (discharge pressure, revolving speed, and the like) of the first hydraulic pump P1, the motor rotation speed, and the like, and then the first operation valve and the second operation valve may be controlled.

Further, the controller 90 may be connected to a temperature detector device 91 for detecting the temperature of the operation fluid, and the differential pressure (the brake setting pressure PV1 and the set pressure PV2) may be detected according to the detected temperature detected by the temperature detector 91.

The control device 90 increases the differential pressure when the detected temperature detected by the temperature detector device 91 is lower than a predetermined set temperature. Specifically, the controller 90 increases the opening aperture of the anti-stall proportional valve 81b when the detected temperature is below freezing and the viscosity of the operation fluid is high, and when the detected temperature is not below the freezing point, the anti-stall proportional valve 81b reduces the opening aperture.

Second Embodiment

Figure 5:
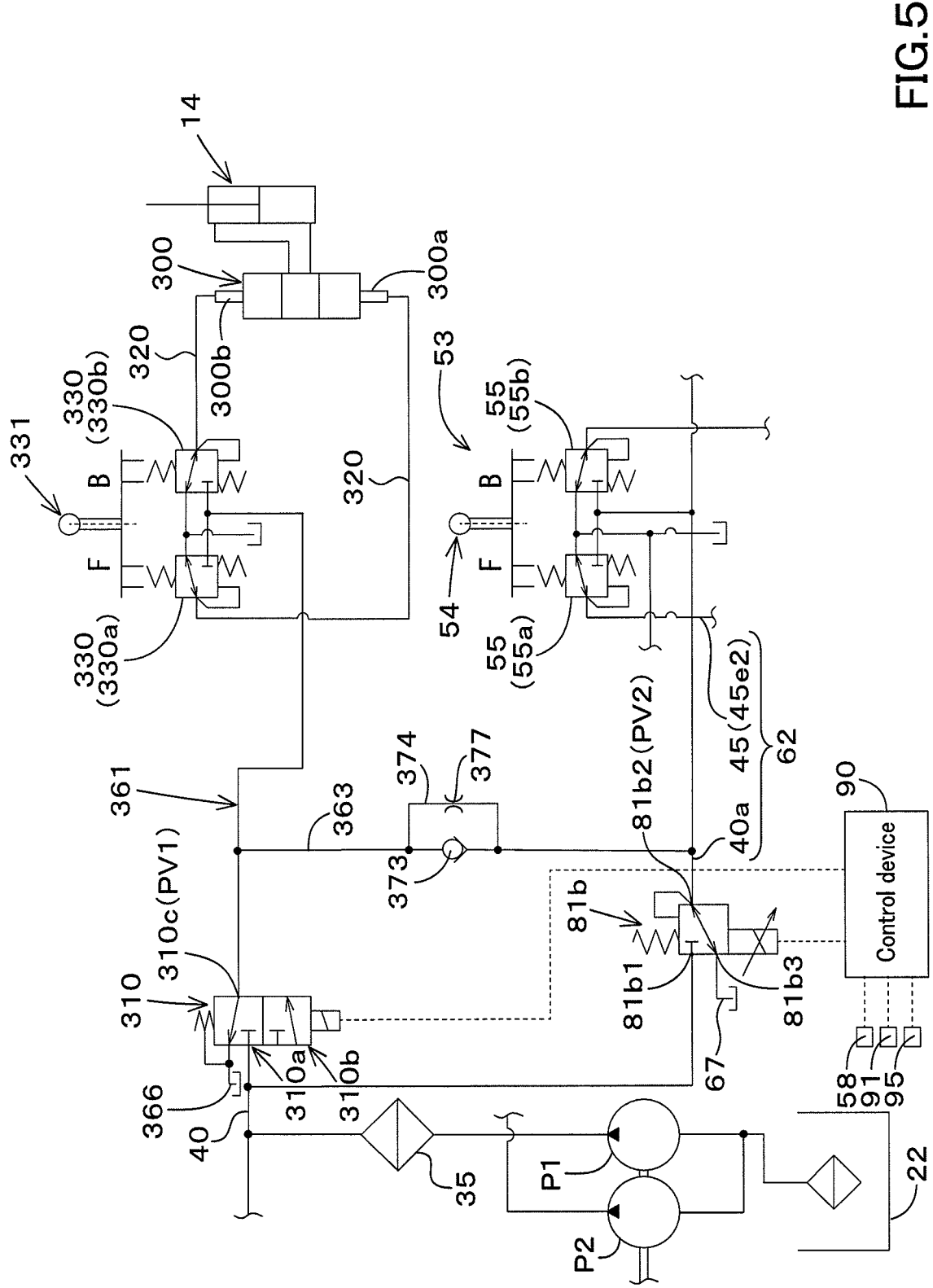
FIG. 5 is a view illustrating a hydraulic system (a hydraulic circuit) for a working machine according to a second embodiment of the present invention.

FIG. 5 shows the hydraulic system of the working machine in the second embodiment. In the second embodiment, as shown in FIG. 5, the first hydraulic device is the working control valve 300, the first operation valve is the hydraulic lock switching valve 310, and the second hydraulic device is a travel drive mechanism 34 (not shown), and the second operation valve is the anti-stall proportional valve 81b.

The first fluid tube is a fluid tube 361 connecting a first hydraulic device (the working control valve 300) and the first operation valve (hydraulic lock switching valve 310) for controlling the operation fluid supplied to the first hydraulic device (the working control valve 300). The second fluid tube controls the operation fluid supplied to the second hydraulic device (travel pumps 52L and 52R of travel drive mechanism 34) and the second hydraulic device (travel pumps 52L and 52R of travel drive mechanism 34). A fluid tube 62 is connected to the operation valve (anti-stall proportional valve 81b).

Similar to the first embodiment, the second fluid tube 62 includes a section (fluid tube) 40a and a traveling fluid tube 45. The third fluid tube is a fluid tube 363 connecting the first fluid tube 361 and the second fluid tube 62.

The working control valve 300 is a valve that controls operation fluid supplied to a hydraulic cylinder (working hydraulic actuator) or the like of a working system. The working control valve 300 is, for example, a boom control valve that controls the operation fluid supplied to the boom cylinder 14 or a bucket control valve that controls the operation fluid supplied to the bucket cylinder 15.

In this embodiment, the operation control valve 300 is described as a boom control valve, but may be a bucket control valve. For convenience of explanation, the working control valve 300 is described as "boom control valve 300".

The boom control valve 300 is, for example, a three-position switching valve. When the boom control valve 300 is operated to one side from the neutral position, the boom control valve 300 supplies operation fluid to the bottom side of the boom cylinder 14. The boom cylinder 14 is extended by discharging the operation fluid discharged from the rod side of the above into a operation fluid tank or the like.

Further, when the boom control valve 300 is operated from the neutral position to the other side, the operation fluid is supplied to the rod side of the boom cylinder 14, then the operation fluid discharged from the bottom side of the boom cylinder 14 is discharged to the operation fluid tank and the like, and thereby the boom cylinder 14 is shortened.

The boom control valve 300 is switched by the pressure (pilot pressure) of the pilot fluid applied to the pressure receiving units 300a and 300b provided in the boom control valve 300.

A working fluid tube 320 is connected to the pressure receiving portions 300a and 300b of the boom control valve 300, respectively. The working fluid tube 320 is a fluid tube that constitutes a part of the first fluid tube 361. A plurality of operation valves (operation valves) 330 (330a, 330b) are connected to the operation fluid tube 320.

The plurality of operation valves 330 (330a, 330b) are valves that apply a predetermined pilot pressure to the plurality of working fluid tubes 320 and change the pilot pressure according to the amount of operation of the operation member 331.

For example, when the operating member 331 is swung in one direction, the operation valve 330a is operated, a pilot pressure is output from the operation valve 330a, and the pilot pressure acts on the pressure receiving portion 300a of the boom control valve 300. When the operation member 331 is swung in the other direction, the operation valve 330b is operated to output a pilot pressure from the operation valve 330b, and the pilot pressure acts on the pressure receiving portion 300b of the boom control valve 300.

That is, by operating the operation member 331, the pilot pressure output from the operation valve 330 is changed, and the boom control valve 300, that is, the boom cylinder 14 can be operated.

The hydraulic lock switching valve 310 is a valve that can stop the operation fluid supplied to the operation valves 330a and 330b. The hydraulic lock switching valve 310 is a two-position switching valve that can be switched between the first position 310a and the second position 310b. When the hydraulic lock switching valve 310 is set to the first position 310a, the pilot fluid from the first hydraulic pump P1 does not flow to the first fluid tube 361, while the first fluid tube 361 is connected to the first discharging fluid tube 366.

That is, when the hydraulic lock switching valve 310 is set to the first position 310a, the pilot fluid from the first hydraulic pump P1 is not supplied to the operation valves 330a and 330b, and thereby establishing the lock state where the pilot pressure due to the operation valves 330a and 330b is not applied to the boom control valve 300 even if the operating member 331 is operated.

When the hydraulic lock switching valve 310 is set to the second position 310b, the pilot fluid from the first hydraulic pump P1 is supplied to the control valves 330a and 330b, and thereby establishing the lock-releasing state where the pilot pressure is applied to the boom control valve 300 in the operations of the control valves 330a and 330b.

A check valve 373 is connected to the third fluid tube 363. The check valve 373 allows operation fluid to flow from the second fluid tube 62 to the first fluid tube 361 and blocks operation fluid from flowing from the first fluid tube 361 to the second fluid tube 62.

Further, bypass fluid tubes 374 are provided on both sides of the check valve 373. The bypass fluid tube 374 is provided with a throttle portion 377 for reducing the flow rate of the operation fluid.

In the second embodiment, the control device 90 can shift to the warm-up mode when the operation of the first operation member 54 of the traveling system is not performed (when the operation valves 55a and 55b are not operated). The setting pressure PV2 of the anti-stall proportional valve 81b is made larger than the pressure (PV1) of the output port 310c of the hydraulic lock switching valve 310 by increasing the opening aperture of the anti-stall proportional valve 81b.

Thus, the control device 90 increases the opening aperture of the anti-stall proportional valve 81b when at least the travel drive mechanism 34 is not operated, so that the operation fluid (pilot fluid) of the second fluid tube 62 flows through the third fluid tube 363, the bypass fluid tube 374, and the hydraulic lock switching valve 310, and the operation fluid can be discharged from the discharge port of the hydraulic lock switching valve 310 to the first discharge fluid channel 366 that communicates with the operation fluid tank or the like.

That is, in the second embodiment, the warm-up can be performed by enabling communication between the hydraulic lock switching valve 310 of the working machine system and the anti-stall proportional valve 81b by the third fluid tube 363.

In addition, when the traveling and the working of the working machine 1 are prohibited, that is, in the case of the hydraulic lock mode, the warm-up mode may be set when the temperature of the pilot fluid (temperature of the operation fluid) detected by the temperature detector device 91 is predetermined temperature or less.

In this case, the hydraulic lock switching valve 310 is switched to the first position 310a, while the anti-stall proportional valve 81b increases the predetermined set pressure. When the warm-up mode is not set, the hydraulic lock switching valve 310 is held at the first position 310a, and the anti-stall proportional valve 81b is in the stopped state (connects the second discharging fluid tube 67 and the fluid tube 40a).

In addition, in a state other than the state where the setting pressure PV2 is higher than the setting pressure PV1, that is, when the setting pressure PV2 of the anti-stall proportional valve 81b becomes lower than the pressure (PV1) of the output port 310c of the hydraulic lock switching valve 310, the pilot fluid on the secondary side may be discharged to the second discharging fluid tube 67 through the anti-stall proportional valve 81b.

Specifically, in the case where only traveling is prohibited among traveling and work of the working machine 1, that is, in the case of the parking mode, the hydraulic lock switching valve 310 is held at the second position 310b and the anti-stall proportional valve 81b is in the stop state.

Thereby, the pilot fluid of the first fluid tube 361 flows to the second discharging fluid tube 67 through the bypass fluid tube 374 and the fluid tube 40a.

In the case where the travel and work of the working machine 1 are in the operable mode, that is, in the case of the operation mode, the warm-up mode is established when the temperature of the pilot fluid detected by the temperature detector device 91 falls below a predetermined temperature.

The hydraulic lock switching valve 310 is held at the second position 310b, and the set pressure PV2 of the anti-stall proportional valve 81b is set lower than the pressure (PV1) of the output port 310c of the hydraulic lock switching valve 310.

Thereby, the pilot fluid of the first fluid tube 361 passes through the bypass fluid tube 374 and the second fluid tube 62 and flows to the second discharging fluid tube 67.

The hydraulic system of the working machine includes a working hydraulic actuator, a working control valve 300 for controlling operation fluid supplied to the working hydraulic actuator, a hydraulic lock switching valve 310 capable of blocking the operation fluid supplied to the working control valve 300, the traveling pumps 52L and 52R that drive the traveling device based on the pressure of the operation fluid, the anti-stall proportional valve 81b capable of controlling the operation fluid supplied to the traveling pumps 52L and 52R, the first fluid tube 361 connecting the working control valve 300 and the hydraulic lock switching valve 310, the second fluid tube 62 connecting the traveling pumps 52L and 52R and the anti-stall proportional valve 81b, and the fluid tube 363 connecting the first fluid tube 361 and the second fluid tube 62.

The anti-stall proportional valve 81b is set to a pressure higher than the pressure (set pressure PV1) set by the hydraulic lock switching valve 310.

According to this, the operation fluid of the second fluid tube 62 can flow through the third fluid tube 363 and the first fluid tube 361 by the anti-stall proportional valve 81b, and the warm-up can be performed.

Third Embodiment

Figure 6:
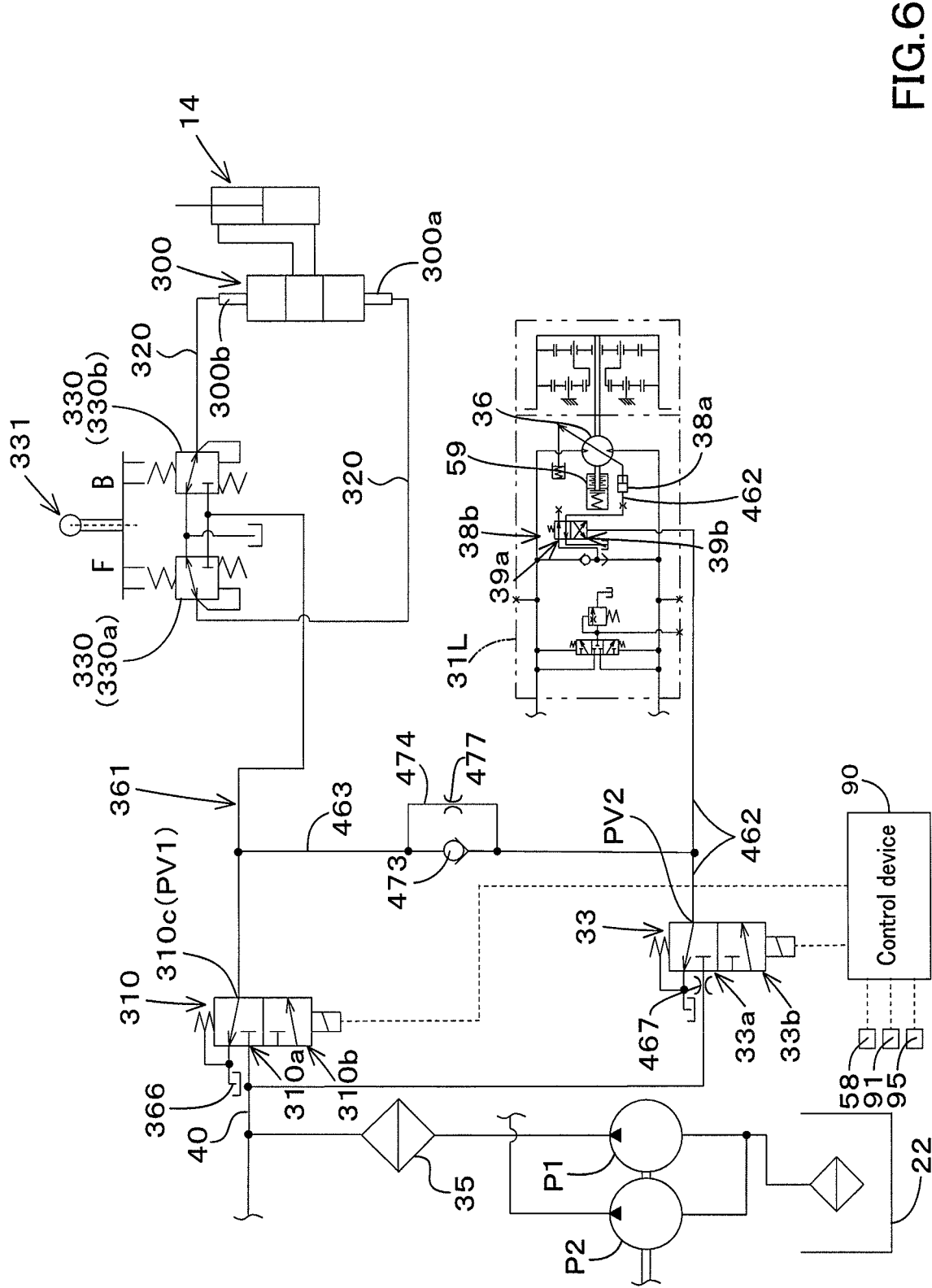
FIG. 6 is a view illustrating a hydraulic system (a hydraulic circuit) for a working machine according to a third embodiment of the present invention.

FIG. 6 shows the hydraulic system of the working machine in the third embodiment. In the third embodiment, as shown in FIG. 6, the first hydraulic device is a working control valve 300, the first operation valve is a hydraulic lock switching valve 310, the second hydraulic device is a traveling motor (HST motor) 36, and the second operation valve is the shift switching valve 33.

As shown in FIG. 6, for example, a throttle portion 467 is provided on the upstream side of the shift switching valve 33. The throttling portion 467 may be disposed between the connection portion where the third fluid tube 463 and the second fluid tube 462 are connected and the shift switching valve 33, or may be disposed in an internal fluid tube under the condition where the shift switching valve 33 is set to the second position 33b.

The first fluid tube is the fluid tube 361 connecting the first hydraulic device (working control valve 300) and a first operation valve (hydraulic lock switching valve 310) for controlling the operation fluid supplied to the first hydraulic device (working control valve 300). The second fluid tube is a fluid tube 462 connecting the second hydraulic device (traveling motor 36) and the second operation valve (gear-shift valve 33) for controlling the operation fluid supplied to the second hydraulic device (traveling motor 36).

The third fluid tube is a fluid tube 463 connecting the first fluid tube 361 and the second fluid tube 462. A check valve 473 is connected to the third fluid tube 463. The check valve 473 allows operation fluid from the second fluid tube 462 to the first fluid tube 361 and blocks operation fluid from the first fluid tube 361 to the second fluid tube 62.

Further, bypass fluid tubes 474 are provided on both sides of the check valve 473. The bypass fluid tube 474 is provided with a throttle portion 477 for reducing the flow rate of the operation fluid.

Thus, the control device 90 sets the shift switching valve 33 to the second position 33b at least when the travel drive mechanism 34 is not operated (when the operation of the first operation member 54 is not performed).

Accordingly, the operation fluid (pilot fluid) of the second fluid tube 462 can pass through the third fluid tube 463 and the hydraulic lock switching valve 310, and can be discharged from the discharge port of the hydraulic lock switching valve 310 to the first discharging fluid tube 366.

That is, in the third embodiment, warm-up can be performed by enabling communication between the hydraulic lock switching valve 310 of the working machine system and the speed change switching valve 33 by the third fluid tube 463.

In the hydraulic lock mode, the warm-up mode is set when the temperature of the pilot fluid detected by temperature detector device 91 becomes lower than or equal to a predetermined temperature. In this case, the hydraulic lock switching valve 310 is switched to the first position 310a, while the shift switching valve 33 is switched to the second position 33b.

When the warm-up mode is not set, the hydraulic lock switching valve 310 is held at the first position 310a, and the shift switching valve 33 is at the first position 33a.

Also, under the state other than the state where the setting pressure PV2 is higher than the setting pressure PV1, that is, when the setting pressure PV2 of the shift switching valve 33 becomes lower than the pressure (PV1) of the output port 310c of the hydraulic lock switching valve 310, the pilot fluid on the secondary side also can be discharged to the second discharging fluid tube 67 through the shift switching valve 33.

For example, in the case of the parking mode, the hydraulic lock switching valve 310 is held at the second position 310b, and the shift switching valve 33 is at the first position 33a. Thus, the pilot fluid in the first fluid tube 361 is discharged through the bypass fluid tube 474 and the speed change valve 33.

In the case of the operation mode, the warm-up mode is set when the temperature of the pilot fluid detected by the temperature detector device 91 becomes lower than or equal to a predetermined temperature. In the warm-up mode, even if the operator (operator) switches the operating member 58 to the second speed, the switching of the shift switching valve 33 is not performed by the operating member 58, and the shift switching valve 33 is held at the first position 33a.

Also, the hydraulic lock switching valve 310 is held at the second position 310b. Thus, the pilot fluid in the first fluid tube 361 is discharged through the bypass fluid tube 474 and the speed change valve 33.

The hydraulic system of the working machine includes the working hydraulic actuator, the working control valve 300 for controlling the operation fluid supplied to the working hydraulic actuator, the hydraulic lock switching valve 310 capable of blocking the operation fluid supplied to the working control valve 300, the traveling motor 36 capable of shifting the traveling device based on the pressure of the operation fluid, the shift switching valve 33 capable of controlling the operation fluid supplied to the traveling motor 36 and shifting the speed, the first fluid tube 361 connecting the working control valve 300 and the hydraulic lock switching valve 310, the second fluid tube 462 connecting the traveling motor 36 and the speed change switching valve 33, and the third fluid tube 463 connecting the first fluid tube 361 and the second fluid tube 462. The shift switching valve 33 is set to a pressure higher than the pressure (set pressure PV1) set by the hydraulic lock switching valve 310.

As a result, the warming up can be performed by allowing the operation fluid of the second fluid tube 462 to flow through the third fluid tube 463 and the first fluid tube 361 with use of the speed change switching valve 33.

Fourth Embodiment

Figure 7:
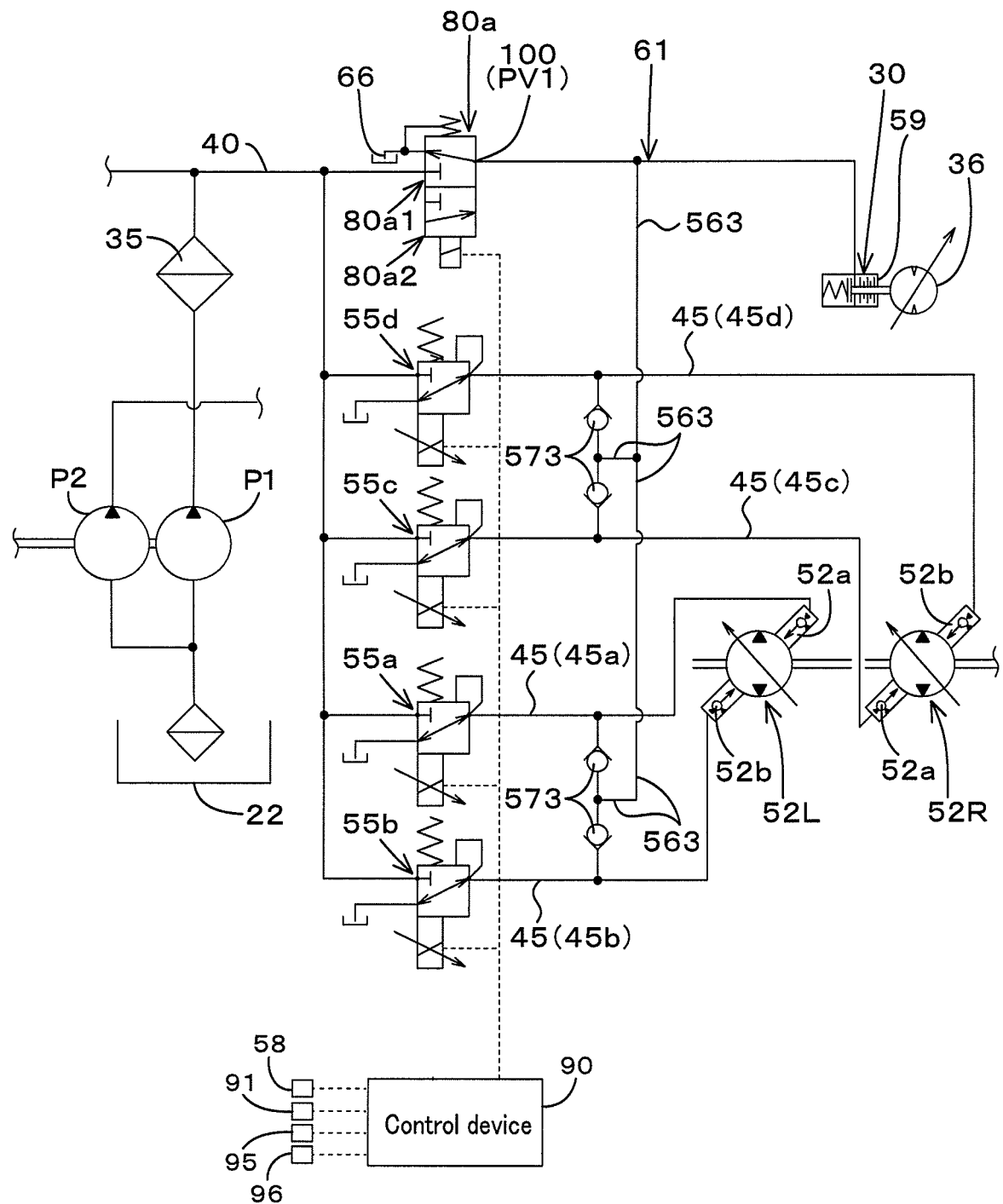
FIG. 7 is a view illustrating a hydraulic system (a hydraulic circuit) for a working machine according to a fourth embodiment of the present invention.

FIG. 7 shows the hydraulic system of the working machine in the fourth embodiment. In the fourth embodiment, as shown in FIG. 7, the first hydraulic device is the brake mechanism 30, the first operation valve is the brake switching valve 80a, and the second hydraulic device is the travel pumps 52L and 52R of the travel drive mechanism 34. The second operation valve includes a plurality of operation valves 55 (55a, 55b, 55c, and 55d).

The plurality of operation valves 55 (55a, 55b, 55c, and 55d), which are the second operation valves, are travel operation valves that control the operation fluid to be supplied to the travel pumps 52L and 52R.

The first fluid tube is a fluid tube 61 connecting the first hydraulic device (brake mechanism 30) and the first operation valve (brake switching valve) for controlling the operation fluid supplied to the first hydraulic device (brake mechanism 30).

The second fluid tube is the traveling fluid tube 45 (first traveling fluid tube 45a, second traveling fluid tube 45b, third traveling fluid tube 45c, fourth traveling fluid tube 45d) connecting the second hydraulic device (travel pumps 52L and 52R of travel drive mechanism 34) and the second operation valves (operation valves 55a, 55b, 55c, and 55d) for controlling the operation fluid to be supplied to the second hydraulic device (traveling pumps 52L and 52R of travel drive mechanism 34).

The third fluid tube is a fluid tube 563 connecting the first fluid tube 61 and the second fluid tube 45. A check valve 573 is connected to the third fluid tube 563. The check valve 573 allows operation fluid from the second fluid tube 45 to the first fluid tube 61 and blocks operation fluid from the first fluid tube 61 to the second fluid tube 45.

The control valves 55a, 55b, 55c, and 55d are proportional solenoid valves, and the opening aperture can be changed according to the control signal from the control device 90. A swingable operation member 96 is connected to the control device 90. When the operating member 96 is operated in a direction corresponding to forward movement, the operation valves 55a and 55c open in accordance with the amount of operation of the operating member 96, and the traveling pumps 52L and 52R rotate forward.

When the operation member 96 is operated in the direction corresponding to reverse, the operation valves 55b and 55d open according to the operation amount of the operation member 96, and the traveling pumps 52L and 52R reversely rotate. When the operation member 96 is operated in the direction corresponding to the left turn, the operation valves 55b and 55c are opened according to the operation amount of the operation member 96, the traveling pump 52L is reversely rotated, and the traveling pump 52R is normally rotated. When the operation member 96 is operated in the direction corresponding to the right turn, the operation valves 55a and 55d open according to the operation amount of the operation member 96, the traveling pump 52L rotates forward, and the traveling pump 52R reverses.

Thus, by operating the operation member 96, the operation valves 55a, 55b, 55c, and 55d can be operated.

For example, in the warm-up mode, the control device 90 sets the set pressure (PV2) of the control valves 55a, 55b, 55c, and 55d to be higher than the brake setting pressure PV1 of the brake switching valve 80a regardless of the operation of the operation member 96.

Specifically, when in the warm-up mode, the control device 90 sets the brake switching valve 80a to the first position 80a1 while increasing the opening aperture of the operation valves 55a, 55b, 55c, and 55d. In this manner, the set pressures (PV2) of the operation valves 55a, 55b, 55c, and 55d are made larger than the brake setting pressure PV1. That is, when the brake switching valve 80a is in the braking state, the operation fluid (pilot fluid) of the traveling fluid tube 45 can be changed to the check valve 573 by increasing the operation valves 55a, 55b, 55c, and 55d. The operation fluid can be warmed up by flowing through the fluid tube 563, the first fluid tube 61 and the brake switching valve 80a to the first discharging fluid tube 66.

The set pressures (PV2) of the control valves 55a, 55b, 55c, and 55d may be the same pressure or different pressures. Further, the set pressures (PV2) of the operation valves 55a, 55b, 55c, and 55d may be sequentially made larger than the brake setting pressure PV1.

The hydraulic system of the working machine includes the brake mechanism 30, the brake operation valve 80a, the traveling pumps 52L and 52R, the operation valves 55a, 55b, 55c, and 55d, the first fluid tube 61 connecting the brake mechanism 30 and the brake operation valve 80a, the second fluid tube 45 connecting the traveling pumps 52L and 52R and the operation valves 55a, 55b, 55c, and 55d, and the third fluid tube 563 connecting the first fluid tube 61 and the second fluid tube 45.

According to this, the operation fluid of the second fluid tube 45 can be allowed to flow to the brake actuating valve 80a through the third fluid tube 563 and the first fluid tube 61 by the operation valves 55a, 55b, 55c, and 55d, and thus the warm-up can be performed.

Fifth Embodiment

Figure 8:
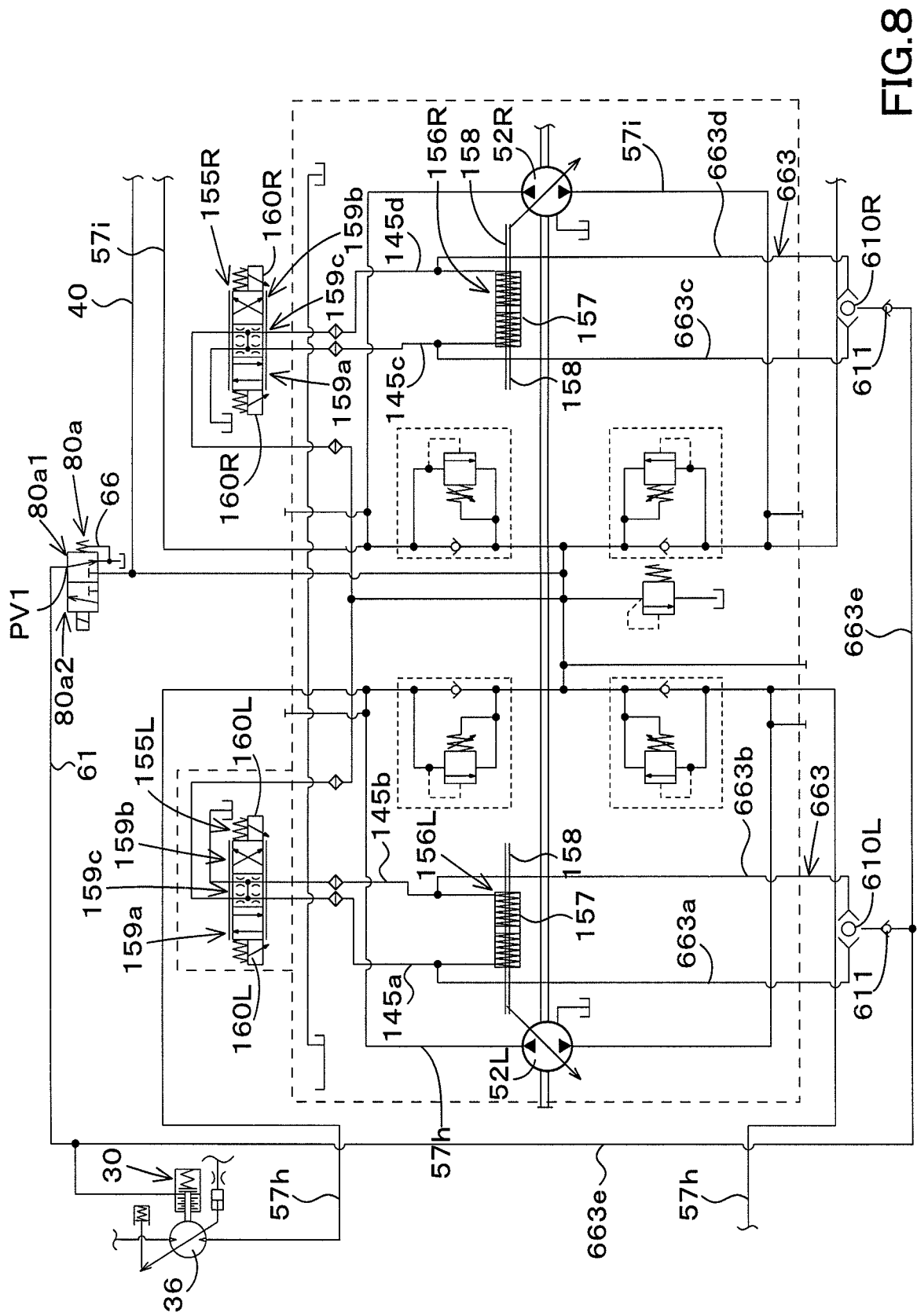
FIG. 8 is a view illustrating a hydraulic system (a hydraulic circuit) for a working machine according to a fifth embodiment of the present invention.

FIG. 8 shows a hydraulic system for a working machine in the fifth embodiment. The hydraulic system shown in FIG. 8 is a hydraulic system for a traveling system, and includes the traveling pumps 52L and 52R and the operation valves 155L and 155R.

The traveling pumps 52L and 52R respectively include regulators 156L and 156R. The regulators 156L and 156R are configured to change the angles (swash plate angles) of the swash plates of the traveling pumps 52L and 52R, and include the supply chamber 157 configured to supply the operation fluid and the piston rod 158 provided in the supply chamber 157.

The piston rod 158 is connected to the swash plate and the swash plate angle can be changed by the operation of the piston rod 158.

The operation valve 155L is a valve that operates the regulator 156L, that is, a valve that controls the operation fluid supplied to the traveling pump 52L. The operation valve 155L is an electromagnetic valve, the spool moves based on a control signal applied from the control device 90 to the solenoid 160L, and thereby the opening aperture by the movement of the spool is changed.

In addition, the operation valve 155L can be switched between a first position 159a, a second position 159b, and a neutral position 159c.

The first port of the operation valve 155L and the supply chamber 157 of the regulator 156L are connected by a first traveling fluid tube 145a. The second port of the operation valve 155L and the supply chamber 157 of the regulator 156L are connected by a second traveling fluid tube 145b.

The operation valve 155R is a valve that operates the regulator 156R, that is, a valve that controls the operation fluid supplied to the traveling pump 52R. The operation valve 155R is a solenoid valve, the spool moves based on a control signal given from the control device 90 to the solenoid 160R, and thereby the opening aperture by the movement of the spool is changed.

In addition, the operation valve 155R can be switched to a first position 159a, a second position 159b, and a neutral position 159c.

The first port of the operation valve 155R and the supply chamber 157 of the regulator 156L are connected by a third traveling fluid tube 145c. The second port of the operation valve 155R and the supply chamber 157 of the regulator 156L are connected by a fourth traveling fluid tube 145d.

If the operation valve 155L and the operation valve 155R are switched to the first position 159a, the traveling pumps 52L and 52R are forward rotated, and if the operation valve 155L and the operation valve 155R are switched to the second position 159b, the traveling pumps 52L and 52R are reversed.

When the operation valve 155L is switched to the first position 159a and the operation valve 155R is switched to the second position 159b, the traveling pump 52L is forward rotated and the traveling pump 52R is reversely rotated. If the operation valve 155L is switched to the second position 159b and the operation valve 155R is switched to the first position 159a, the traveling pump 52L reversely rotates and the traveling pump 52R rotates forward.

Thus, the operation valve 155L and the operation valve 155R can switch the travel pumps 52L and 52R to either forward rotation or reverse rotation, and are one of travel operation valves.

In the hydraulic system of the working machine in the fifth embodiment, warm-up can be performed by the switching between the brake switching valve 80a, the operation valve 155L and the operation valve 155R.

As shown in FIG. 8, the first hydraulic device is the brake mechanism 30, the first operation valve is the brake switching valve 80a, the second hydraulic device is the traveling pumps 52L and 52R, and the second operation valve is the operation valve 155L and the operation valve 155R.

The first fluid tube is a fluid tube 61 connecting the first hydraulic device (brake mechanism 30) and the first operation valve (brake switching valve) for controlling the operation fluid supplied to the first hydraulic device (brake mechanism 30).

The second fluid tube is the traveling fluid tube (the first traveling fluid tube 145a, the second traveling fluid tube 145b, the third traveling fluid tube 145c, and the fourth traveling fluid tube 145d) connecting the second hydraulic device (the travel pumps 52L and 52R of travel drive mechanism 34) and the second operation valves (the operation valves 155L and 155R) for controlling the operation fluid to be supplied to the second hydraulic device (the travel pumps 52L and 52R of travel drive mechanism 34).

The third fluid tube is a fluid tube 663 connecting the first fluid tube 61 and the second fluid tube (the first traveling fluid tube 145a, the second traveling fluid tube 145b, the third traveling fluid tube 145c, and the fourth traveling fluid tube 145d).

The third fluid tube 663 includes a fluid tube 663a connected to the first traveling fluid tube 145a, a fluid tube 663b connected to the second traveling fluid tube 145b, a fluid tube 663c connected to the third traveling fluid tube 145c, and a fluid tube 663d connected to the traveling fluid tube 145d.

Further, the third fluid tube 663 includes a fluid tube 663e which joins the fluid tubes 663a, 663b, 663c and 663d.

The high pressure selection valve 610L is connected to a junction where the fluid tube 663a and the fluid tube 663b join, and the high pressure selection valve 610R is also connected to a junction where the fluid tube 663c and the fluid tube 663d join. One end of the fluid tube 663e is connected to the high pressure selection valves 610L and 610R, and the other end is connected to the first fluid tube 61.

In the fluid tube 663e, a check valve 611 is connected closer to the first fluid tube 61 than the high pressure selection valves 610L and 610R. The check valve 611 allows the operation fluid from the high pressure selection valves 610L and 610R to the first fluid tube 61, and blocks the operation fluid from the first fluid tube 61 to the high pressure selection valves 610L and 610R.

For example, in the warm-up mode, the control device 90 makes the set pressure (PV2) of the operation valve 155L and the operation valve 155R larger than the brake setting pressure PV1 of the brake switching valve 80a.

Specifically, in the warm-up mode, the control device 90 sets the brake switching valve 80a to the first position 80a1 while switching the operation valve 155L and the operation valve 155R to the first position 159a. The set pressure (PV2) of the operation valve 155R is made larger than the brake setting pressure PV1.

That is, when the brake switching valve 80a is in the braking state, the operation fluid (pilot fluid) of the traveling fluid tube 145 can be controlled by the high pressure selection valves 610L and 610R by increasing the opening aperture of the operation valve 155L and the operation valve 155R. The third fluid tube 663, the first fluid tube 61, and the brake switching valve 80a can be warmed up by flowing into the first discharging fluid tube 66.

When the control device 90 is in the warm-up mode, the switching of the operation valve 155L and the operation valve 155R is not limited to the example described above, and the operation valve 155L and the operation valve 155R may be switched to the second position 159b. Alternatively, one of the operation valve 155L and the operation valve 155R may be switched to the first position 159a, and the other may be switched to the second position 159b.

Figure 9:
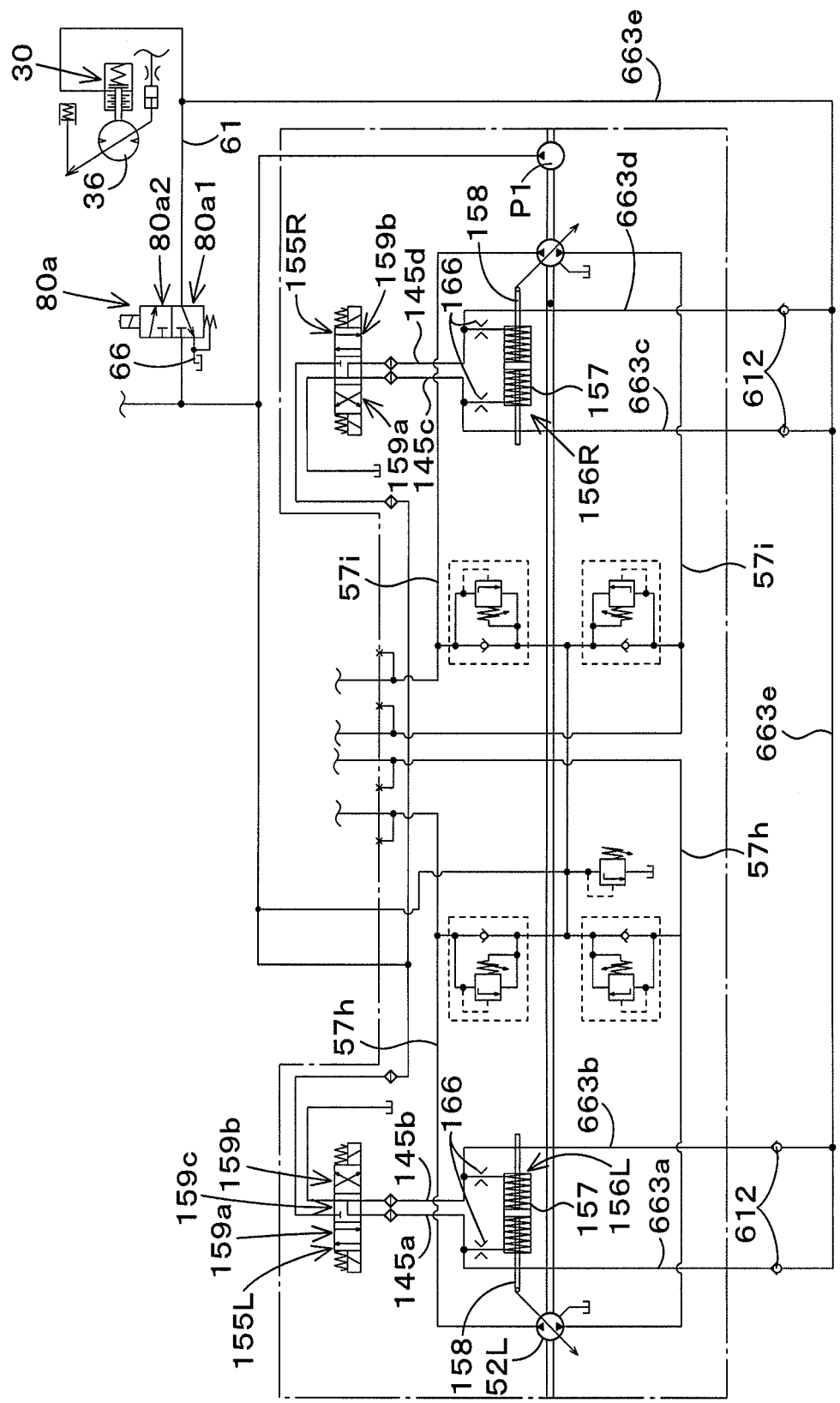
FIG. 9 is a view illustrating a modified example of the hydraulic system for the working machine according to the fifth embodiment.

FIG. 9 shows a modification of the hydraulic system of the working machine in the fifth embodiment. In FIG. 9, the same configuration as that of the fifth embodiment will not be described.

As shown in FIG. 9, the third fluid tube 663 includes a fluid tube 663a connected to the first traveling fluid tube 145a, a fluid tube 663b connected to the second traveling fluid tube 145b, and a fluid tube 663c connected to the third traveling fluid tube 145c, and a fluid tube 663d connected to the fourth traveling fluid tube 145d.

Further, the third fluid tube 663 includes a fluid tube 663e which joins the fluid tubes 663a, 663b, 663c and 663d. A check valve 612 is connected to each of the fluid tubes 663a, 663b, 663c, and 663d. The check valve 612 allows the operation fluid from the second fluid tube to the first fluid tube 61 and blocks the operation fluid from the first fluid tube 61 to the second fluid tube.

Also in the modification of FIG. 9, when the warm-up mode is set, the controller 90 switches the operation fluid of the second fluid tube through the third fluid tube 663 by switching the operation valve 155L and the operation valve 155R. The warm-up can be performed by allowing the operation fluid to flow into the fluid tube 61.

The first traveling fluid tube 145a, the second traveling fluid tube 145b, the third traveling fluid tube 145c, and the fourth traveling fluid tube 145d are provided with a throttle portion 166 for reducing the flow rate of operation fluid. Since the flow rate supplied to or discharged from the supply chamber 157 is reduced by the throttling portion 166, the traveling ability (operability) can be improved so as not to be in rapid acceleration and rapid deceleration.

When warming up, switching between the first position 159a and the second position 159b in the operation valve 155L and the operation valve 155R may be alternately performed. The pilot fluid that has acted on the traveling fluid tubes (the first traveling fluid tube 145a, the second traveling fluid tube 145b, the third traveling fluid tube 145c, and the fourth traveling fluid tube 145d) is discharged from the first discharging fluid tube 66 of the brake operation valve 80a through the fluid tube 663e, and thereby the swash plates of the HST pumps (traveling pumps) 52L and 52R are held at the neutral position without being tilted.

Sixth Embodiment

The hydraulic system of the working machine 1 according to the sixth embodiment connects the first fluid tube connected to the first hydraulic device and the second fluid tube connected to the second hydraulic device with the third fluid tube, connects the first discharging fluid tube to a first operation valve that controls the operation fluid supplied to the device, and connects the second discharging fluid tube to the second operation valve that controls the operation fluid supplied to the second hydraulic device. In this manner, the warm-up can be easily performed.

In this embodiment, the first hydraulic device is the brake mechanism 30, and the second hydraulic device is the transmission mechanism. The first operation valve is one of the brake operation valves that control the operation fluid supplied to the brake mechanism 30, and the second operation valve is a gear switching operation that controls the operation fluid supplied to the transmission mechanism.

Hereinafter, the first fluid tube, the second fluid tube, and the third fluid tube will be described.

Figure 10:
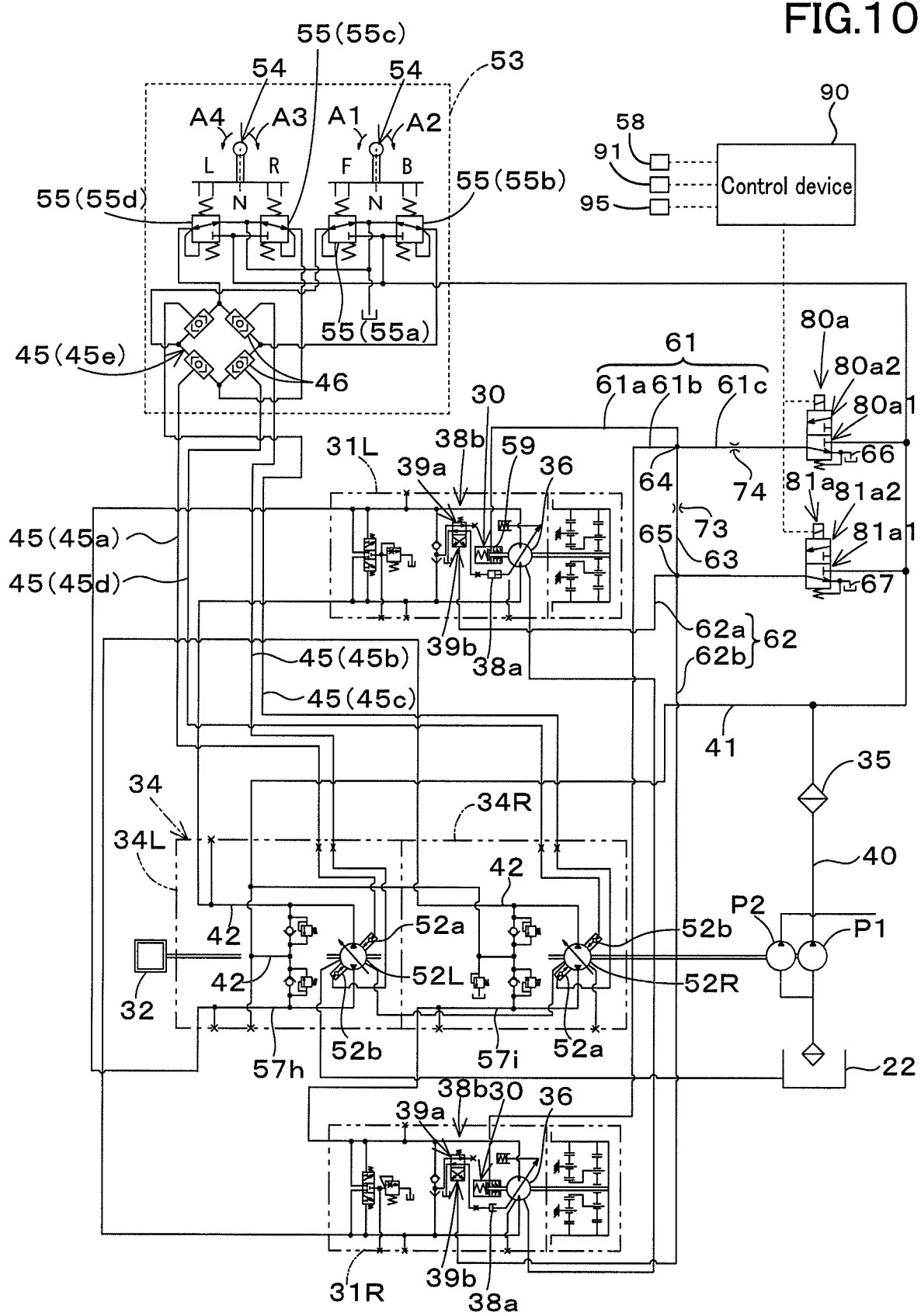
FIG. 10 is a view illustrating a hydraulic system (a hydraulic circuit) for a working machine according to a sixth embodiment of the present invention.
Figure 11A:
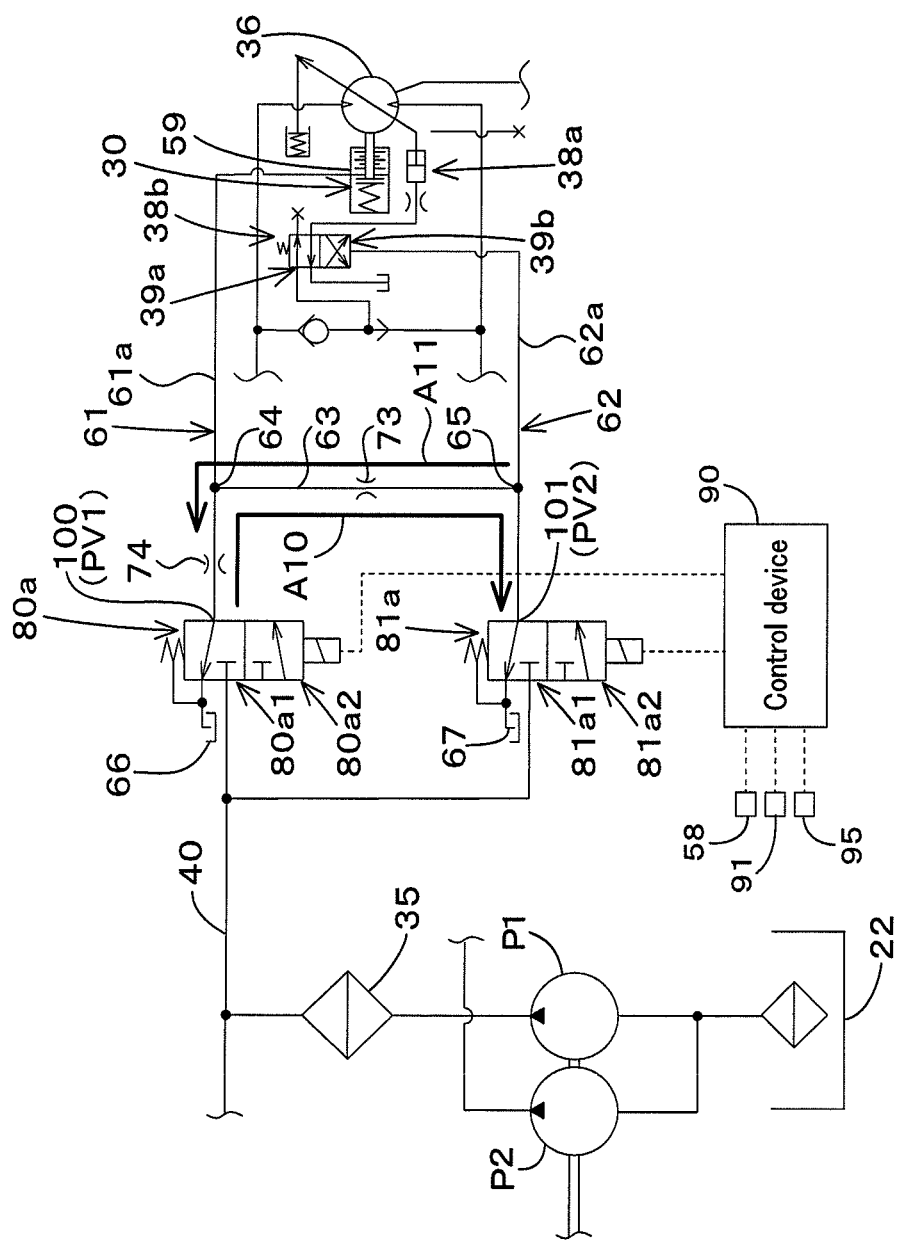
FIG. 11A is a partially-enlarged view illustrating a traveling hydraulic system for the working machine according to the sixth embodiment.

As shown in FIGS. 10 and 11A, the first fluid tube 61 is a fluid tube connecting a first hydraulic device (the brake mechanism 30) and a first operation valve (brake switching valve) 80a that controls the operation fluid to be supplied to the first hydraulic device (the brake mechanism 30).

In this embodiment, the first fluid tube 61 includes a first brake fluid tube 61a and a second brake fluid tube 61b. The first brake fluid tube 61a is a fluid tube connecting the brake mechanism 30 of the first traveling motor mechanism 31L and the brake switching valve (first operation valve) 80a.

The second brake fluid tube 61b is a fluid tube connecting the brake mechanism 30 of the second traveling motor mechanism 31R and the brake switching valve (first operation valve) 80a. The first brake fluid tube 61a and the second brake fluid tube 61b join in a middle portion, and the combined fluid tube (a combined fluid tube of the first brake fluid tube 61a and the second brake fluid tube 61b) 61c is connected to the brake switching valve 80a.

The combined fluid tube 61c is provided with a throttle portion 74 for reducing the flow rate of the operation fluid. In other words, in the first fluid tube 61, the throttling portion 74 is arranged in a section between a connection portion (a confluent portion 64 described later) where the third fluid tube 63 is connected to the first fluid tube 61 and a connection portion connected to the brake switching valve 80a.

A first discharging fluid tube 66 is connected to the discharge port of the brake switching valve 80a. The first discharging fluid tube 66 can discharge the operation fluid that has passed through the brake switching valve 80a, that is, the operation fluid of the first fluid tube 61 (the first brake fluid tube 61a and the second brake fluid tube 61b). The first discharging fluid tube 66 is connected to the suction portion of the hydraulic pump, the operation fluid tank 22 and the like.

The second fluid tube 62 is a fluid tube connecting a second hydraulic device (a transmission mechanism) and a second operation valve (a transmission switching valve) 81a that controls operation fluid supplied to the second hydraulic device (a transmission mechanism).

In this embodiment, the second fluid tube 62 includes a first shifting fluid tube 62a and a second shifting fluid tube 62b. The first shifting fluid tube 62a is a fluid tube connecting the travel switching valve 38b of the transmission mechanism in the first traveling motor mechanism 31L and the transmission switching valve (second operation valve) 81a.

The second shifting fluid tube 62b is a fluid tube connecting the travel switching valve 38b of the transmission mechanism in the second traveling motor mechanism 31R and the transmission switching valve (second operation valve) 81a.

The first speed change fluid tube 62a and the second speed change fluid tube 62b merge midway, and the fluid tube after the merging is connected to the speed change switching valve 81a. A second discharging fluid tube 67 is connected to the discharge port of the shift switching valve 81a.

The second discharging fluid tube 67 can discharge the operation fluid that has passed through the transmission switching valve 81a, that is, the operation fluid of the second fluid tube 62 (the first shifting fluid tube 62a and the second shifting fluid tube 62b). The second discharging fluid tube 67 is connected to the suction portion of the hydraulic pump, the operation fluid tank 22 and the like.

The third fluid tube 63 is a fluid tube connecting the first fluid tube 61 and the second fluid tube 62. The third fluid tube 63 connects a confluent portion 64 where the first brake fluid tube 61a and the second brake fluid tube 61b join and a confluent portion 65 where the first transmission fluid tube 62a and the second transmission fluid tube 62b join. The third fluid tube 63 is provided with a throttle portion 73 for reducing the flow rate of operation fluid.

The control device 90 sets a differential pressure between the brake setting pressure (first set pressure) PV1 to be set by the brake switching valve (first operation valve) 80a and the shift setting pressure (second set pressure) PV2 to be set by the second operation valve (shift switching valve) 81a.

The brake setting pressure PV1 is, for example, the pressure of the output port 100 of the brake switching valve 80a. In other words, the first set pressure PV1 is a pressure that acts on the first fluid tube 61 (the first brake fluid tube 61a and the second brake fluid tube 61b).

The second set pressure (shift setting pressure) PV2 is, for example, the pressure of the output port 101 of the shift switching valve 81a. In other words, the second set pressure PV2 is a pressure that acts on the second fluid tube 62 (the first shifting fluid tube 62a and the second shifting fluid tube 62b).

The control device 90 controls the brake switching valve 80a and the shift switching valve 81a so that a differential pressure between the first set pressure PV1 and the second set pressure PV2 is generated. For example, in the warm-up mode for warming up, the control device 90 makes the brake setting pressure PV1 of the brake switching valve 80a higher than the shift setting pressure PV2 of the transmission switching valve 81a.

Specifically, when the warm-up mode is set, the control device 90 sets the brake setting pressure PV1 to be equal to or higher than the release pressure at which the brake mechanism 30 releases the braking by setting the brake switching valve 80a to the second position 80a2.

In addition, when the warm-up mode is set, the control device 90 sets the shift setting pressure PV2 to the decelerating pressure at which the transmission mechanism decelerates by setting the shift switching valve 81a to the first position 81a1.

That is, when the brake switching valve 80a is in the braking release state and the transmission mechanism is in the decelerating state, the brake setting pressure PV1 is higher than the shift setting pressure PV2 and the brake setting pressure PV1 of the operation fluid set by the brake switching valve 80a. Becomes higher than the shift setting pressure PV2 of the operation fluid set by the shift switching valve 81a.

As shown by arrow A10 in FIG. 11A, when brake setting pressure PV1 is higher than shift setting pressure PV2, the operation fluid that has passed through the brake switching valve 80a flows to the second fluid tube 62 through the first fluid path 61 and the third fluid tube 63, and then the operation fluid is discharged from the discharge port of the shift switching valve 81a to the second discharging fluid tube 67.

Thereby, it is possible to warm up the first fluid tube (brake fluid tube) and the second fluid tube (shifting fluid tube). In the warm-up mode, for example, the mode switch 95 which can be switched ON/OFF is connected to the control device 90, and when the mode switch 95 is ON, the warm-up mode is set, and when the mode switch 95 is turned off, the warm-up mode is released.

When the mode switch 95 is OFF, the gear shift can be performed by the operation of the operation member 58, or the braking and the release of the braking can be performed automatically or manually.

Now, in the embodiment described above, the brake setting pressure PV1 of the brake switching valve 80a is higher than the shift setting pressure PV2 of the transmission switching valve 81a; however instead of that, the shift setting pressure PV2 of the transmission switching valve 81a may be higher than the brake setting pressure PV1 of the brake switching valve 80a.

Specifically, when the warm-up mode is set, the control device 90 sets the brake setting pressure PV1 to the braking pressure at which the brake mechanism 30 brakes by setting the brake switching valve 80a to the first position 80a1. In addition, when the warm-up mode is set, the control device 90 sets the speed setting valve PV to the second position 81a2 to set the speed setting pressure PV2 to the speed increasing pressure at which the speed change mechanism accelerates.

That is, when the transmission mechanism is in the accelerating state under the state where the brake switching valve 80a is in the braking state, the brake setting pressure PV1 is lower than the shift setting pressure PV2, and the shift setting pressure PV2 of the operation fluid set by the transmission switching valve 81a is higher than the brake setting pressure PV1 of the operation fluid set by the brake switching valve 80a.

As indicated by an arrowed line A11 in FIG. 11A, when the brake setting pressure PV1 is lower than the shift setting pressure PV2, the operation fluid that has passed through the shift switching valve 81a flows to the fluid tube 61 through the second fluid tube 62 and the third fluid tube 63, and is discharged to the first discharging fluid tube 66 from the discharge port of the brake switching valve 80a.

Thereby, it is possible to warm up the first fluid tube (brake fluid tube) and the second fluid tube (shifting fluid tube).

Figure 11B:
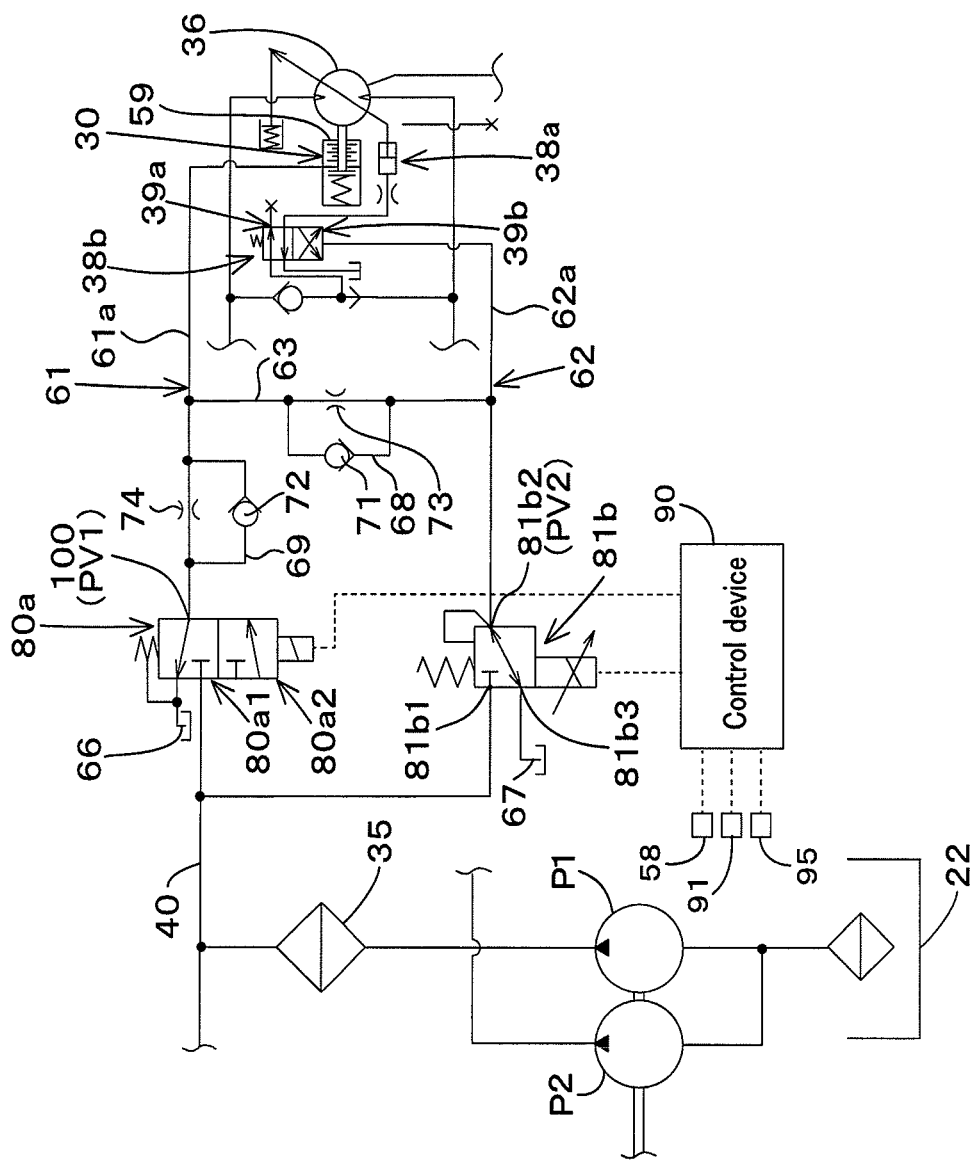
FIG. 11B is a view illustrating a first modified example of FIG. 11A.

FIG. 11B is a view showing a first modified example of FIG. 11A. For convenience of explanation, FIG. 11B shows the fluid tube on the side of the first traveling motor mechanism 31L (the first brake fluid tube 61a and the first transmission fluid tube 62a); the fluid tube on the second traveling motor mechanism 31R side (the second brake fluid tube 61b and the second transmission fluid tube 62b) are omitted, and the modified example may be applied to the fluid tube on the second traveling motor mechanism 31R side.

As shown in FIG. 11B, the first modified example is an example in which the transmission operation valve (second operation valve) is changed to a shift proportional valve 81b configured by an electromagnetic proportional valve.

The shift proportional valve 81b has a primary port (pump port) 81b1 and a secondary port 81b2. The primary port 81b1 of the shift proportional valve 81b is connected to the discharging fluid tube 40. The secondary port 81b2 of the shift proportional valve 81b is connected to the second fluid tube 62 (a first shifting fluid tube 62a and a second shifting fluid tube 62b).

The discharge port 81b3 of the shift proportional valve 81b is connected to the operation fluid tank 22 via the second discharging fluid tube 67. In the shift proportional valve 81b, the second set pressure PV2 is the pressure of the secondary port 81b2.

In the first modification, when the warm-up mode is set, the controller 90 sets the brake switching valve 80a to the second position 80a2, while the opening aperture of the shift proportional valve 81b is minimized, for example, the opening corresponding to the first speed.

That is, in the warm-up mode, the control device 90 sets the brake setting pressure PV1 of the brake switching valve 80a to the release pressure or more, and sets the shift setting pressure PV2 of the shift proportional valve 81b to the decelerating pressure at which the transmission mechanism decelerates.

Thus, even when the shift switching valve 81a is changed to the shift proportional valve 81b, the brake setting pressure PV1 can be set to the shift setting pressure PV2 by setting the opening aperture of the shift proportional valve 81b.

Also in this case, the operation fluid that has passed through the brake switching valve 80a flows to the second fluid tube 62 through the first fluid path 61 and the third fluid tube 63, and the operation fluid can be discharged from the discharge port 81b3 of the shift proportional valve 81b to the second discharge fluid tube 67.

In the first modification, when the warm-up mode is set, the controller 90 sets the brake switching valve 80a to the first position 80a1, and may set the opening of the shift proportional valve 81b to the maximum, for example, an opening aperture corresponding to the second speed.

That is, in the warm-up mode, the control device 90 sets the brake setting pressure PV1 of the brake switching valve 80a to the braking pressure, and sets the shift setting pressure PV2 of the shift proportional valve 81b to the speed increasing pressure that the transmission mechanism accelerates.

According to this, by setting the opening aperture of the shift proportional valve 81b, it is possible to set brake setting pressure PV1 to be lower than the shift setting pressure PV2.

In this case, the operation fluid that has passed through the shift proportional valve 81b flows to the first fluid tube 61 through the second fluid tube 62 and the third fluid tube 63, and the operation fluid can be discharged from the discharge port of the brake switching valve 80a to the first discharging fluid tube 66.

In the first modification, the shift setting pressure PV2 is determined by setting the opening aperture of the shift proportional valve 81b to the maximum and minimum in the warm-up mode; however, the opening aperture of the shift proportional valve 81b may be changed arbitrarily.

For example, in the warm-up mode, the magnitude of the differential pressure between the brake setting pressure PV1 and the shift setting pressure PV2 can be changed by arbitrarily changing the opening aperture of the shift proportional valve 81b.

The control device 90 is connected to the temperature detector device 91 for detecting the temperature of the operation fluid, and the differential pressure (a differential pressure between the brake setting pressure PV1 and the shift setting pressure PV2) may be set according to the detected temperature detected by the temperature detector device 91.

The control device 90 increases the differential pressure when the detected temperature detected by the temperature detector device 91 is lower than a predetermined set temperature. Specifically, when the detected temperature is below the freezing point and the viscosity of the operation fluid is high, the controller 90 increases the opening aperture of the shift proportional valve 81b, and when the detected temperature is not below the freezing point, the controller 90 reduce the degree of opening.

As shown in FIG. 11B, the first bypass fluid tube 68 may be connected to the third fluid tube 63. The first bypass fluid tube 68 is provided with a first check valve 71. The first check valve 71 allows operation fluid from the second fluid tube 62 to the first fluid tube 61, and prevents the operation fluid from flowing from the first fluid tube 61 toward the second fluid tube 62.

In the first fluid tube 61, a second bypass fluid tube 69 may be connected between the brake switching valve 80a and the third fluid tube 63. A second check valve 72 is provided in the second bypass fluid tube 69.

The second check valve 72 is a valve configured to allow the operation fluid to flow from the connection portion between the first fluid tube 61 and the third fluid tube 63 to the brake switching valve 80a and to prevent the operation fluid from flowing from the brake switching valve 80a toward the connection portion.

As described above, when the first bypass fluid tube 68 and the second bypass fluid tube 69 are provided, the operation fluid of the second fluid tube 62 is transferred to the first bypass fluid tube 68 and the second bypass when warming up. The fluid tube 69 can be passed and discharged from the first discharging fluid tube 66 of the brake switching valve 80a.

Although the first fluid tube 68 and the first check valve 71 are provided in the third fluid tube 63, the first fluid tube 68 and the first check valve 71 may not be provided. Further, although the second bypass fluid tube 69 and the second check valve 72 are provided in the first fluid tube 61, the second bypass fluid tube 69 and the second check valve 72 may be not provided.

Alternatively, the hydraulic system for the working machine may include a pair of the first bypass fluid tube 68 and the first check valve 71 or a pair of the second bypass fluid tube 69 and the second check valve 72.

Figure 11C:
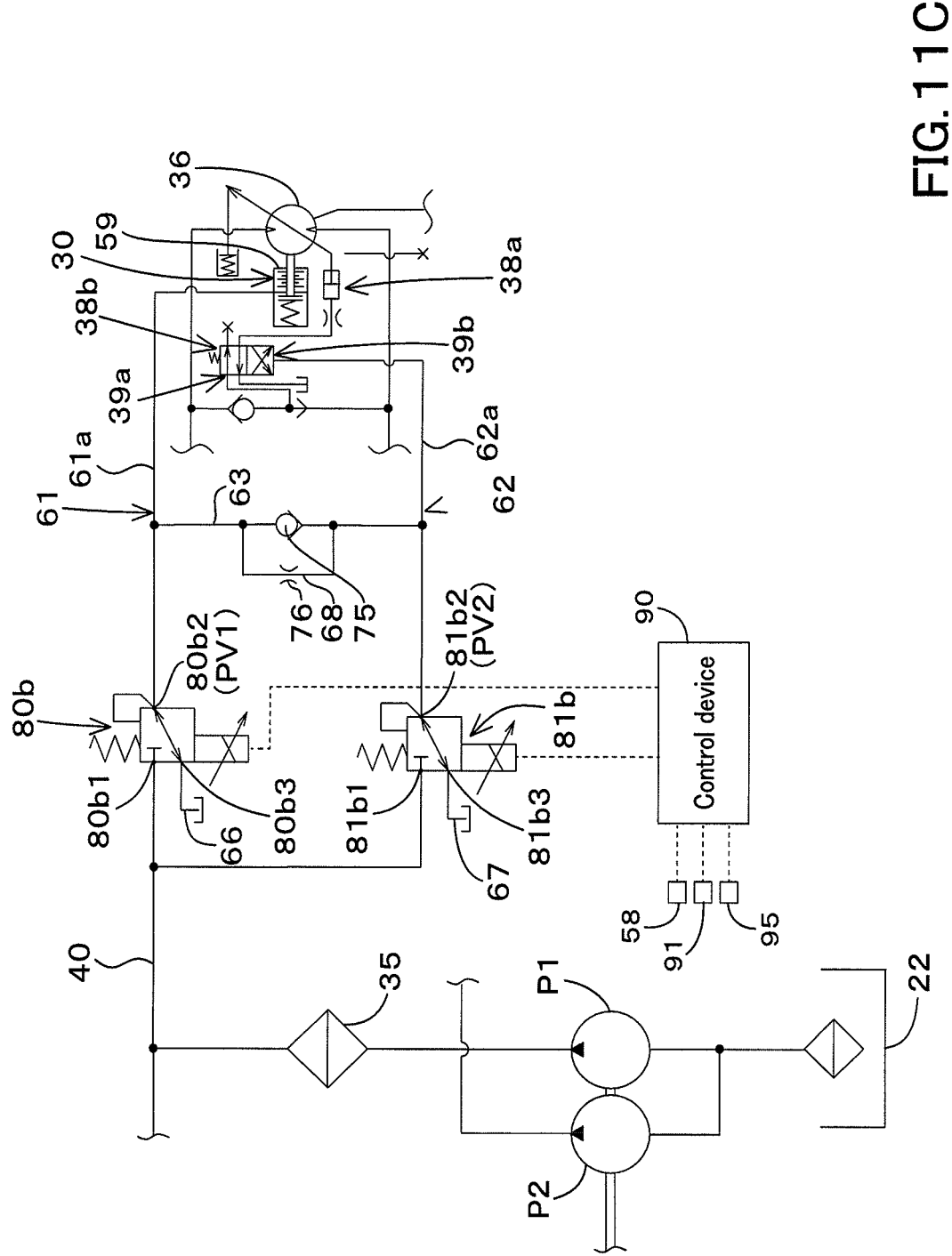
FIG. 11C is a view illustrating a second modified example of FIG. 11B.

FIG. 11C shows a second modification of FIG. 11B. In the second modification, as shown in FIG. 11C, the brake operation valve is changed to an electromagnetic proportional valve (brake switching valve) 80b. The brake proportional valve 80b has a primary port (pump port) 80b1 and a secondary port 80b2.

The primary port 80b1 of the brake proportional valve 80b is connected to the discharging fluid tube 40. The secondary port 80b2 of the brake proportional valve 80b is connected to the first fluid tube 61. The discharge port 80b3 of the brake proportional valve 80b is connected to the operation fluid tank 22 through the first discharging fluid tube 66.

In the brake proportional valve 80*b*, the first set pressure PV1 is the pressure of the secondary port 80*b*2. In FIG. 11C, the first bypass fluid tube 68 is provided with a throttling portion 76.

In the second modification, when the warm-up mode is set, the controller 90 sets the opening of the brake proportional valve 80*b* to a maximum so that the brake mechanism 30 has a release pressure equal to or higher than the release pressure. The opening aperture of the valve 81*b* is set to the minimum (opening aperture corresponding to the first speed).

That is, when in the warm-up mode, the control device 90 sets the brake setting pressure PV1 of the brake proportional valve 80*b* to the release pressure or more, and sets the shift setting pressure PV2 of the gear shift proportional valve 81*b* to the decelerating pressure at which the transmission mechanism decelerates.

Thus, even when the brake switching valve 80*a* is changed to the brake proportional valve 80*b*, the brake setting pressure PV1 is set to the shift setting pressure PV2 by setting the opening apertures of the brake proportional valve 80*b* and the shift proportional valve 81*b*.

Also in this case, the operation fluid that has passed through the brake proportional valve 80*b* flows to the second fluid tube 62 through the first fluid path 61 and the third fluid tube 63, and the operation fluid can be discharged from the discharge port 81*b*3 of the shift proportional valve 81*b* to the second discharge fluid tube 67.

In the first modification, the control device 90 in the warm-up mode may minimize the opening aperture of the brake proportional valve 80*b* so as to obtain the braking pressure at which the brake mechanism 30 can perform the braking, and may maximize the shift proportional valve 81*b* (to the opening aperture corresponding to the second speed).

That is, when in the warm-up mode, the control device 90 sets the brake setting pressure PV1 of the brake proportional valve 80*b* to the braking pressure, and sets the shift setting pressure PV2 of the shift proportional valve 81*b* to the speed increasing pressure that the transmission mechanism accelerates. According to this, by setting the opening apertures of the brake proportional valve 80*b* and the shift proportional valve 81*b*, it is possible to set the brake setting pressure PV1 to be lower than the shift setting pressure PV2.

In this case, the operation fluid that has passed through the shift proportional valve 81*b* flows to the first fluid tube 61 through the second fluid tube 62 and the third fluid tube 63, and the operation fluid can be discharged from the discharge port 80*b*3 of the brake proportional valve 80*b* to the first discharging fluid tube 66.

In the second modification, in the warm-up mode, the brake setting pressure PV1 is determined by setting the opening aperture of the brake proportional valve 80*b* to the maximum and minimum; however, the opening aperture of the brake proportional valve 80*b* may be changed arbitrarily.

For example, in the warm-up mode, the differential pressure between the brake setting pressure PV1 and the transmission set pressure PV2 can be changed by arbitrarily changing the opening aperture of the brake proportional valve 80*b*. Further, in the case of the second modified example as well as the first modified example, the control device 90 may change the opening aperture of the brake proportional valve 80*b* on the basis of the detected temperature detected by the temperature detector device 91.

Further, in the second modification, as shown in FIG. 11C, the third fluid tube 63 may be provided with the third check valve 75. The third check valve 75 allows operation fluid to flow from the second fluid tube 62 to the first fluid tube 61 and prevents the operation fluid flowing from the first fluid tube 61 to the second fluid tube 62.

Figure 11D:
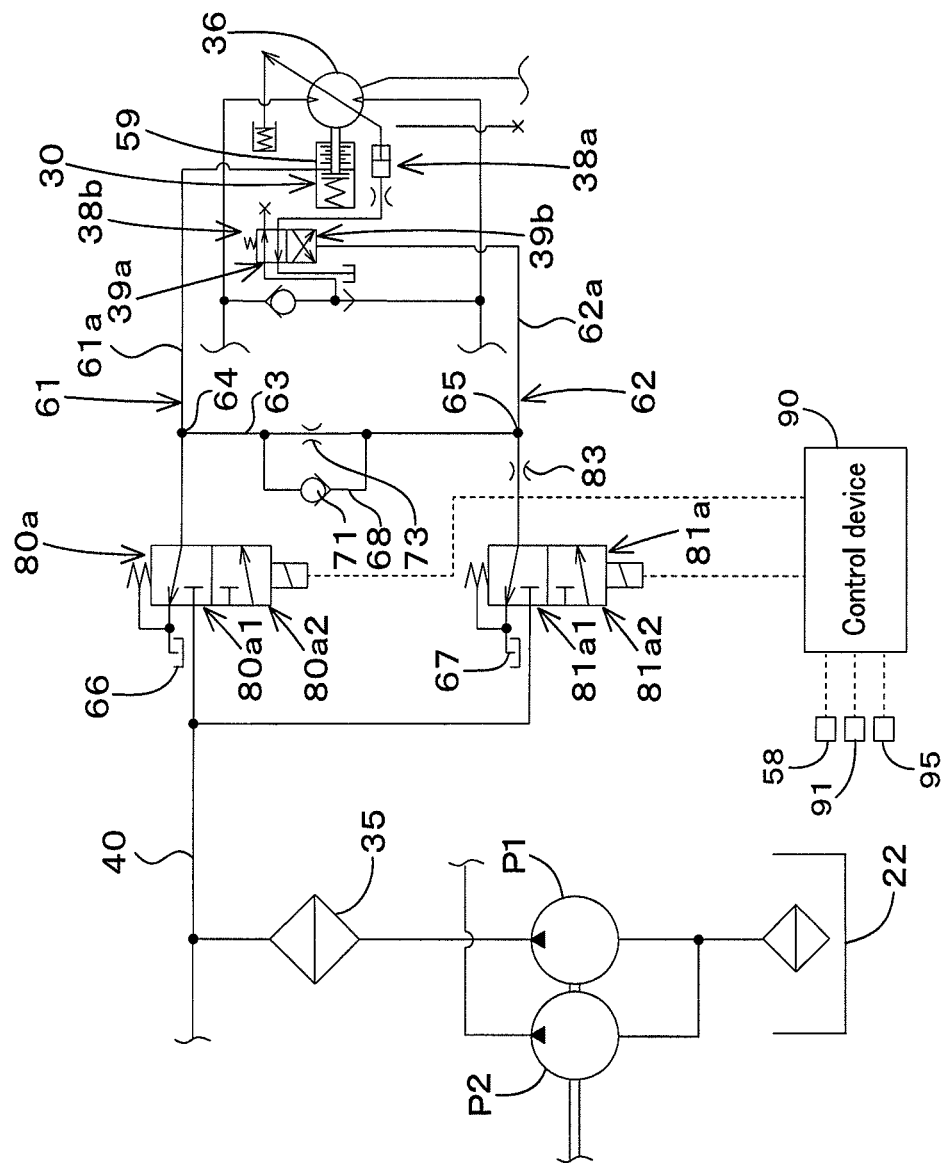
FIG. 11D is a view illustrating a third modified example of FIG. 11A.

FIG. 11D shows a third modification of FIG. 11A. In this third modification, in the hydraulic circuit provided with the brake switching valve 80*a* and the speed change switching valve 81, the third fluid tube 63 is provided with the throttling portion 73, and both ends of the throttling portion 73 are provided with the first bypass fluid tube 68. A first check valve 71 is provided in the first bypass fluid tube 68.

Further, in the second fluid tube 62, a throttling portion 83 is provided in the section between the transmission switching valve 81*a* and the merging portion 65. In such a case, the control device 90 performs the braking by the brake mechanism 30 and switches the shift switching valve 81*a* to the second position 81*a*2, whereby the operation fluid of the second fluid tube 62 is transferred to the first bypass fluid tube 68. The first discharging fluid tube 66 of the brake switching valve 80 *a* can be discharged through the first check valve 71.

In the embodiment described above, a first measurement device configured to measure the first set pressure (brake setting pressure) PV1 set by the first operation valve, that is, the brake operation valve (the brake switching valve 80*a*, the brake proportional valve 80*b*) may be connected to a second measuring device capable of measuring the second set pressure (shift setting pressure) PV2 set by the second operation valve, that is, the shift operation valve (the shift switching valve 81*a* and the shift proportional valve 81*b*). In the warm-up mode, the control device 90 may control the first operation valve and the second operation valve so that the brake setting pressure PV1 can be higher than the shift setting pressure PV2 or the brake setting pressure PV1 can be lower than the shift setting pressure PV2.

The controller 90 may estimate the first set pressure (brake setting pressure) PV1 and the second set pressure (shift setting pressure) PV2 from the drive (discharge pressure, rotational speed, and the like) of the first hydraulic pump P1, the motor speed, and the like. In this manner, the controller 90 may control the first operation valve and the second operation valve.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

The first actuation valve may be a valve other than the brake actuation valve that controls the operation fluid supplied to the brake mechanism 30. The second operation valve may be a valve other than the transmission operation valve that controls the operation fluid supplied to the transmission mechanism.

The transmission mechanism may be any mechanism capable of shifting the traveling device 5, and may be HST pumps (traveling pumps) 52L and 52R, or other hydraulic devices. Also, the transmission operation valve may be any one as long as it changes the operation fluid supplied to the transmission mechanism. In addition, the transmission mechanism may be a valve (HST pump proportional valve) capable of supplying the operation fluid to control controlling the swash plates of the HST pumps (traveling pumps) 52L and 52R, and may be a valve capable of changing the operation fluid supplied to the HST pumps (traveling pumps) 52L and 52R through the operation valve 55.

The hydraulic system for the working machine includes the hydraulic pump to output the operation fluid, the brake mechanism to brake the traveling device and release the braking based on the pressure of the operation fluid, the traveling operation pump for controlling the operation fluid supplied to the brake mechanism, the travel operation valve for controlling the operation fluid supplied to the traveling pump, the first fluid tube connecting the brake mechanism and the brake operation valve, the second fluid tube connecting the traveling pump and the traveling actuating valve, the third fluid tube connecting the first fluid tube and the second fluid tube, the first discharging fluid tube communicated with the brake operation valve and configured to discharge the operation fluid having flowed through the brake operation valve, and the second discharging fluid tube communicated with the traveling operation valve and configured to discharge the operation fluid having flowed through the traveling operation valve. The traveling operation valve sets a pressure higher than the brake setting pressure set by the brake operation valve.

The brake operation valve is a brake switching valve that can be switched between a first position set to a braking pressure at which the brake mechanism performs braking and a second position set to a release pressure.

The brake operation valve is a brake proportional valve that can be changed from a braking pressure at which the braking mechanism performs braking to a releasing pressure.

The second fluid tube is provided with an operation valve capable of changing the pressure for supplying the operation fluid to the traveling pump according to the operation, and the third fluid tube is connected to a section between the traveling operation valve and the operation valve in the second fluid tube.

The second fluid tube is provided with an operation valve capable of changing the pressure for supplying operation fluid to the traveling pump according to the operation, the third fluid tube is connected to the section between the operation valve and the traveling pump in the second fluid tube, and the traveling operation valve is provided upstream of the operation valve in the second fluid tube.

The travel operation valve is an anti-stall proportional valve that changes the pressure of operation fluid to the hydraulic pump based on the rotational speed of the prime mover, or a hydraulic lock switching valve that can stop the supply of operation fluid to the operation valve.

The hydraulic system includes the check valve provided in the third fluid tube and allowing operation fluid to flow from the second fluid tube to the first fluid tube and blocking the operation fluid from flowing from the first fluid tube to the second fluid tube.

The hydraulic system for the working machine includes: a traveling motor configured to be operated by the operation fluid outputted from the traveling pump; and a shift fluid tube connecting the traveling motor and the traveling pump. The traveling pump includes the regulator to operate the swash plate of the traveling pump. The traveling operation valve switches the travel pump between forward rotation and reverse rotation by operating the swash plate by the regulator.

The hydraulic system for the working machine includes a hydraulic pump for outputting the operation fluid, the brake mechanism for braking the traveling device and releasing the braking based on the pressure of the operation fluid, the shift mechanism to change a speed of the traveling device based on the pressure of the operation fluid, the brake operation valve for controlling the operation fluid supplied to the brake mechanism, the shift operation valve for controlling the operation fluid supplied to the transmission mechanism, the first fluid tube connecting the brake mechanism and the brake operation valve, the second fluid tube connecting the transmission mechanism and the speed-changing operation valve, a third fluid tube connecting the first fluid tube and the second fluid tube, the first discharge fluid tube communicated with the brake operation valve and configured to discharge the operation fluid having flowed through the brake operation valve, and the second discharging fluid tube communicated with the speed-changing operation valve and configured to discharge the operation fluid that has passed through the speed-changing operation valve. The brake setting pressure of the operation fluid set by the brake operation valve is made higher than the shift setting pressure of the operation fluid set by the gear shift valve.

The brake operation valve sets the brake setting pressure to a release pressure at which the brake mechanism releases the braking, and the speed-changing operation valve sets the shift setting pressure to a decelerating pressure at which the transmission mechanism reduces the speed of the traveling device.

The brake operation valve is a brake switching valve capable of switching between a first position where the brake setting pressure is set to a braking pressure at which the brake mechanism performs the braking and a second position where the brake setting pressure is set to the release pressure.

The speed-changing operation valve is a shift switching valve that can switch between a first position where the shift setting pressure is set to the decelerating pressure and a second position where the shift mechanism sets the speed of the traveling device higher than a predetermined speed.

The brake operation valve is a brake proportional valve capable of changing the brake setting pressure from a braking pressure at which the brake mechanism performs braking to a releasing pressure.

The speed-changing operation valve is a brake proportional valve that can change the shift setting pressure from an accelerating pressure to a decelerating pressure that makes the speed of the traveling device faster than a predetermined speed.

The hydraulic system for the working machine includes the hydraulic pump for outputting the operation fluid, the brake mechanism for braking the traveling device and releasing the braking based on the pressure of the operation fluid, the speed-changing mechanism to change a speed of the traveling device based on the pressure of the operation fluid, the brake operation valve for controlling the operation fluid supplied to the brake mechanism, the transmission operation valve for controlling the operation fluid supplied to the transmission mechanism, the first fluid tube for connecting the brake mechanism and the brake operation valve, the second fluid tube connecting the transmission mechanism and the speed-changing operation valve, the third fluid tube connecting the first fluid tube and the second fluid tube, a first discharge fluid tube communicated with the brake operation valve and configured to discharge the operation fluid having flowed through the brake operation valve, and the second discharging fluid tube communicated with the speed-changing operation valve and configured to discharge the operation fluid that has passed through the speed-changing operation valve. The shift setting pressure of the operation fluid set by the speed-changing operation valve is made higher than the brake setting pressure of the operation fluid set by the brake operation valve.

The brake operation valve sets the brake setting pressure to a braking pressure at which the brake mechanism performs braking, and the speed-changing operation valve sets the brake setting pressure to a speed increasing pressure that causes the transmission mechanism to make the speed of the traveling device faster than a predetermined speed.

The brake operation valve is a brake switching valve capable of switching between a first position where the brake setting pressure is set as the braking pressure and a second position where the brake setting pressure is set as the release pressure where the brake mechanism releases the braking.

The speed-changing operation valve is a valve configured to be switched between a first position for setting the shift setting pressure lower than the acceleration pressure and a second position for setting the shift setting pressure to the acceleration pressure.

The brake operation valve is a brake proportional valve that can change the brake setting pressure from a braking pressure to a release pressure at which the brake mechanism releases the braking.

The speed-changing operation valve is a brake proportional valve that can change the shift setting pressure from a speed-up pressure at which the shift mechanism makes the speed of the traveling device faster than a predetermined speed to a speed-down pressure that lowers the speed to be slower than a predetermined speed.

The hydraulic system for the working machine includes the hydraulic pump for outputting operation fluid, the first hydraulic device to be operated based on the pressure of the operation fluid, the second hydraulic device to be operated with operation fluid separately from the first hydraulic device, a first operation valve for controlling operation fluid to be supplied to the hydraulic device, a second operation valve for controlling operation fluid to be supplied to the first hydraulic device, a first fluid tube connecting the first operation valve and the first hydraulic device, a second fluid tube connecting the second operation valve and the second hydraulic device, a third fluid tube connecting the first fluid tube and the second fluid tube, a first discharging fluid tube connected to the first operation valve and configured to discharge the operation fluid that has passed through the first operation valve, a second discharging fluid tube connected to the second operation valve and configured to discharge the operation fluid that has passed through the second operation valve, and a control device configured to set a differential pressure between the first set pressure set by the first operation valve and the second set pressure set by the second operation valve.

The hydraulic system for the working machine includes a temperature detector device that detects the temperature of the operation fluid. The control device sets the differential pressure depending on the detected temperature that is the temperature detected by the temperature detector device.

The controller increases the differential pressure when the detected temperature is lower than a predetermined set temperature.

The hydraulic system for the working machine includes a first bypass fluid tube connected to the third fluid tube, and a first check valve arranged in the first bypass fluid tube and configured to allow the operation fluid to flow from the second fluid tube to the first fluid tube and prevent the operation fluid from flowing from the fluid tube to the second fluid tube.

The first hydraulic device is a brake mechanism configured to brake the traveling device and releases the braking based on the pressure of the operation fluid supplied from the first fluid tube. The second hydraulic device is a speed-changing mechanism configured to change a speed pf the traveling device on the basis of the pressure of operation fluid supplied from the second fluid tube. The first operation valve is the brake operation valve configured to control the operation fluid to be supplied to the brake mechanism. The second operation valve is the speed-changing operation valve configured to control the operation fluid to be supplied to the brake mechanism.

The control device sets the first set pressure set by the brake operation valve to the release pressure at which the brake mechanism releases the braking, sets the second set pressure set by the speed-changing operation valve to the speed-up pressure at which the speed-changing mechanism increases the speed on the traveling device to be higher than a predetermined speed, and sets the differential pressure between the release pressure and the speed-up pressure.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A hydraulic system for a working machine, comprising:
   a hydraulic pump to output an operation fluid to an outputting fluid tube;
   a braking valve connected to the outputting fluid tube and configured to flow the operation fluid of a first pressure to a first fluid tube;
   a braking device to brake a traveling motor in accordance with the first pressure of the operation fluid in the first fluid tube, the traveling motor driving a traveling device;
   a traveling valve connected to the outputting fluid tube and configured to flow the operation fluid of a second pressure to a second fluid tube, which includes an operation valve;
   a traveling pump to control the operation fluid supplied to the traveling motor in accordance with a pilot pressure of the operation fluid applied from the operation valve;
   a third fluid tube to connect the first fluid tube and the second fluid tube;
   a discharging fluid tube connected to the braking valve; and
   a controller to control the braking valve and the traveling valve so that the second pressure is greater than the first pressure, thereby to discharge the operation fluid through the second fluid tube, the third fluid tube, the first fluid tube, the braking valve, and the discharging fluid tube.

2. The hydraulic system according to claim 1, wherein the braking valve is a switching valve switching between first and second positions, which allows and blocks the operation fluid of the first pressure to be applied to the braking device, respectively.

3. The hydraulic system according to claim 1, wherein the braking valve is a proportional valve to change a pressure of the operation fluid from zero to the first pressure.

4. The hydraulic system according to claim 1, wherein the third fluid tube is connected to the second fluid tube at a point between the traveling valve and the operation valve.

5. The hydraulic system according to claim 1,
wherein the third fluid tube is connected to the second fluid tube at a point between the operation valve and the traveling pump.

6. The hydraulic system according to claim 1,
wherein the traveling valve is an anti-stall proportional valve to change the first pressure, based on a revolving speed of a prime mover, or a hydraulic lock switching valve to block the operation fluid.

7. The hydraulic system according to claim 1, further comprising:
a check valve arranged in the third fluid tube and configured to allow the operation fluid to flow from the second fluid tube to the first fluid tube and blocking the operation fluid from first fluid tube to the second fluid tube.

8. The hydraulic system according to claim 1, further comprising:
a speed-changing fluid tube connecting the traveling motor and the traveling pump,
wherein the traveling pump includes a regulator to regulate a swash plate of the traveling pump, and
wherein the traveling valve operates the regulator to move the swash plate, thereby switching between normal rotation and reverse rotation of the traveling pump.

9. A hydraulic system for a working machine, comprising:
a hydraulic pump to output an operation fluid to an outputting fluid tube;
a braking valve connected to the outputting fluid tube and configured to flow the operation fluid of a first pressure to a first fluid tube;
a braking device to brake a traveling motor in accordance with the first pressure of the operation fluid in the first fluid tube, the traveling motor driving a traveling device;
a speed-changing valve connected to the outputting fluid tube and configured to flow the operation fluid of a second pressure to a second fluid tube;
a speed-changing device connected to the second fluid tube and configured to change a speed of the traveling motor in accordance with the second pressure of the operation fluid in the second fluid tube;
a third fluid tube to connect the first fluid tube and the second fluid tube;
a second discharging fluid tube connected to the speed-changing valve; and
a controller to control the braking valve and the speed-changing valve so that the first pressure is greater than the second pressure, thereby to discharge the operation fluid through the first fluid tube, the third fluid tube, the second fluid tube, the speed-changing valve, and the second discharging fluid tube.

10. The hydraulic system according to claim 9,
wherein the controller to controls the first pressure so that the braking device does not brake the traveling motor, and the second pressure so that the speed-changing device reduces the speed of the traveling motor.

11. The hydraulic system according to claim 9,
wherein the braking valve is a switching valve switching between first and second positions, which allows and blocks the operation fluid of the first pressure to be applied to the braking device, respectively.

12. The hydraulic system according to claim 9,
wherein the speed-changing valve is a switching valve switching between first and second positions, which allows and blocks the operation fluid of the second pressure to be applied to the speed-changing device, respectively.

13. The hydraulic system according to claim 9,
wherein the braking valve is a proportional valve to change a pressure of the operation fluid applied to the braking device, from zero to the first pressure.

14. The hydraulic system according to claim 9,
wherein the speed-changing valve is a proportional valve to change a pressure of the operation fluid applied to the speed-changing device, from zero to the second pressure.

15. A hydraulic system for a working machine, comprising:
a hydraulic pump to output an operation fluid to an outputting fluid tube;
a braking valve connected to the outputting fluid tube and configured to flow the operation fluid of a first pressure to a first fluid tube;
a braking device to brake a traveling motor in accordance with the first pressure of the operation fluid in the first fluid tube, the traveling motor driving a traveling device;
a speed-changing valve connected to the outputting fluid tube and configured to flow the operation fluid of a second pressure to a second fluid tube;
a speed-changing device connected to the second fluid tube and configured to change a speed of the traveling motor in accordance with the second pressure of the operation fluid in the second fluid tube;
a third fluid tube to connect the first fluid tube and the second fluid tube;
a first discharging fluid tube connected to the braking valve; and
a controller to control the braking valve and the speed-changing valve so that the second pressure is greater than the first pressure, thereby to discharge the operation fluid through the second fluid tube, the first fluid tube, the third fluid tube, the braking valve, and the first discharging fluid tube.

16. The hydraulic system according to claim 15,
wherein the controller to controls the first pressure so that the braking device brakes the traveling motor, and the second pressure so that the speed-changing device increases the speed of the traveling motor.

17. The hydraulic system according to claim 15,
wherein the braking valve is a switching valve switching between first and second positions, which allows and blocks the operation fluid of the first pressure to be applied to the braking device, respectively.

18. The hydraulic system according to claim 15,
wherein the speed-changing valve is a switching valve switching between first and second positions, which allows and blocks the operation fluid of the second pressure to be applied to the speed-changing device, respectively.

19. The hydraulic system according to claim 15,
wherein the braking valve is a proportional valve to change a pressure of the operation fluid applied to the braking device, from zero to the first pressure.

20. The hydraulic system according to claim 15,
wherein the speed-changing valve is a proportional valve to change a pressure of the operation fluid applied to the speed-changing device, from zero to the second pressure.

* * * * *